United States Patent [19]

Chiron et al.

[11] 3,845,413

[45] Oct. 29, 1974

[54] WIDEBAND NON RECIPROCAL INTEGRATED CIRCUITS UTILIZING SURFACE WAVE PROPAGATION

[75] Inventors: Bernard Chiron; Claude Rannou; Nicole Bernard, all of Paris, France

[73] Assignee: Societe Lignes Telegraphiques Et Telephoniques, Paris, France

[22] Filed: Oct. 23, 1973

[21] Appl. No.: 408,858

Related U.S. Application Data

[63] Continuation of Ser. No. 259,074, June 1, 1972, abandoned.

[52] U.S. Cl. ................ 333/1.1, 333/24.1, 333/24.2, 333/95 S

[51] Int. Cl. ................ H01p 1/32

[58] Field of Search ................ 333/1.1, 24.1–24.3, 333/31 R, 31 A, 95 S

[56] References Cited

UNITED STATES PATENTS

| | | | |
|---|---|---|---|
| 3,393,383 | 7/1968 | Chiron et al. | 333/24.1 |
| 3,617,951 | 11/1971 | Anderson | 333/1.1 |

*Primary Examiner*—Paul L. Gensler
*Attorney, Agent, or Firm*—Kemon, Palmer & Estabrook

[57] ABSTRACT

The present invention relates to non-reciprocal devices operating in the very high, ultra high, and higher frequency bands. It utilizes in a novel manner, the properties of TM or quasi-TM surface waves or hybrid waves, for example of the $HE_{11}$ type when such waves are propagated at the surface of a gyromagnetic medium subjected to an external megnetizing field. In its simplest form, the device includes a propagation medium which is at least partly formed of gyromagnetic material at least partially emersed in a magnetic field, the direction of which is at right angles to the axis of propagation. Input and output coupling means feed the device with a TEM space wave and couple a space wave out of the device and mode adapters transform the space wave into TM, quasi-TM or hybrid $HE_{11}$ surface waves at the input and back to TEM space waves at the output.

57 Claims, 42 Drawing Figures

Fig:2

WIDEBAND NON RECIPROCAL INTEGRATED CIRCUITS UTILIZING SURFACE WAVE PROPAGATION

This is a continuation of application Ser. No. 259,074 filed June 1, 1972, now abandoned.

PRIOR ART AND THEORETICAL BACKGROUND

The present invention relates to non-reciprocal VHF and microwave transmission circuits.

Non reciprocal circuits are circuits whose transmission characteristics (attenuation, phase shift) change in accordance with the direction of propagation of the waves through the circuit. Circuits of this kind are known which consist of sections of transmission line (coaxial lines, waveguides, microstrip circuits, etc.), which incorporate a ferrimagnetic or gyromagnetic material (hereinafter referred to as magnetic material) which is subjected to the action of a d.c. magnetising field. The permeability of such a material under external magnetisation is a tensor, which means that the impedance of the medium for a wave propagating therein depends upon the orientation of the d.c. magnetising field and the magnetic field of the wave in relation to a reference set of axes fixedly located in relation to the said medium. The wave magnetic field is reversed when the direction of propagation is reversed. This property is the basis of the design of circuits known as isolators, phase shifters, etc..., of which, for example, isolators transmit waves with a low insertion loss in the forward direction (a few dB and sometimes less) and with much larger isolation in the reverse direction (some tens of dB). Most of these circuits have common characteristics which no longer satisfy the heightened requirements of present-day users, viz:

— a relatively small bandwidth, rarely exceeding an octave, even when using superimposed d.c. fields of different values, as in the case of resonance isolators, for example;

— generally poor mean temperature stability and means power stability even if, for example, conductive solders or bonding agents are employed.

In the case of resonance isolators, for example, the operating frequency is directly proportional to the magnetising field, and since this superimposed field is usually fixed and advantageously limited for reasons of space requirement and weight of the magnet, the operating band is relatively narrow. In the case of field displacement isolators, for example, if structures of the rectangular or circular waveguide type re used, the bandwidth is limited by that of the actual waveguide. If coaxial or three plate structures are used, which propagate TEM mode waves, field displacement is frequently accompanied by excitation of parasitic modes and therefore of guided modes which have cut-off frequencies which limit the pass band of the apparatus. In the case of Faraday effect isolators, the bandwidth is set by the bandwidth of the actual circular waveguide, and by mode converters, and it will never exceed one octave. When the isolators are formed of circulators, of which one of the ports is terminated on a matched load, the bandwidth of the isolator is that of the circulator and is ultimately very small. In three-plate technology with propagation in the TEM mode, it rarely exceeds an octave. Junction or differential phase shift circulators are also limited by the bandwidth of the waveguides, and here again the bandwidth is at most equal to one octave.

With regard to the temperature stability and mean power stability (which are often interrelated), they are reduced owing to the well-known variations of the permeability of magnetic material with temperature or by the fact that the Curie point of the materials employed is too low. On the other hand, the energy which is not transmitted in the reverse direction, as in the case of resonance isolators, often remains in the magnetic material, which is itself located within a waveguide or in a coaxial thereby rendering the evacuation of the heat difficult. This results in a considerable increase in the temperature of the material. Moreover, the use of absorbers within the volume in which the wave propagates, increases the insertion loss (attenuation in the forward direction) regardless of the technology used.

The present invention is based upon a novel utilisation of the properties of the wave modes known as TM or quasi-TM surface waves or hybrid waves, for example of the $HE_{11}$ type, within a ferromagnetic or gyromagnetic medium subjected to the action of a constant magnetising field, associated in some cases with a medium consisting of a dielectric material, the two media then contributing to the propagation of the surface waves.

It is usual practice to confine the case of planar guided waves of the TEM mode (in which the electric and magnetic fields are both perpendicular to the direction of propagation), and it therefore appears to be desirable to define briefly what is meant by surface TM, quasi-TM and hybrid $HE_{11}$ waves. A relatively recent article published in the "Journal of Applied Physics" (1950, page 1,119) by G. Goubau deals with surface waves along a cylindrical wire. Surface waves have been defined by Sommerfeld. Although guided by a conductor, they occupy a very large amount of space around it, which makes their use impractical. Goubau has shown that the energy can be concentrated around the wire by coating the surface of the latter with a dielectric layer. This work shows that the concentration of the energy around the conductor depends upon the dimensions of the conductor and of the dielectric, and it has led to a reduction in the space factor, which may be defined as the space containing 90 percent (or any other specified fraction) of the energy which is propagated, at values practically acceptable in radio communication. These investigations have been continued and amongst others have been described in an article published in "Les Annales des Telecommunications," Vol. 8, No. 11, page 367 (November 1953), by Messrs. Chavance and Chiron. By quasi-TM surface wave is meant a wave travelling under very similar conditions and showing a weak h.f. magnetic field component in the direction of propagation. By "$HE_{11}$ hybrids waves" are meant surface waves which have a dominant component of the electric field perpendicular to the direction of propagation, without the other components being zero. This wave type has a longitudinal component of the magnetic field in addition to the transverse components. The alternating magnetic field therefore does not show a rectilinear polarisation, and in some cases its polarization may be circular. This distribution of the fields forms the basis of one of the embodiments of the invention.

The surface waves, whatever their propagating mode, which are employed in the devices according to the invention have the advantage of propagating under fixed conditions in a very wide frequency band (more than three times as wide as those of TEM waves within or along the same support structure). Moreover, the distribution of the microwave frequency in or around the support structure tends to establish spontaneously a non-rectilinear wave, i.e., to establish a longitudinal component of the magnetic field in addition to the transverse components. A circular polarisation of the magnetic field may readily establish as just stated in the case of $HE_{11}$ waves.

The use of a surface wave propagating in a ferrimagnetic medium to the design of a non-reciprocal phase shifter has been disclosed in subject of U.S. Pat. No. 3,393,383 filed on Sept. 30, 1966, assigned to the present Assignee. By disposing a magnetised ferrimagnetic medium within the radio transmission space of a conductive line in such manner that the high-frequency magnetic field is not parallel to the magnetising field, at least in a part of the volume occupied by the ferrimagnetic material, a non-reciprocal effect is obtained especially in regard to the phase of a wave propagating at least partially in a non-TEM mode, since, for technological convenience, the magnetising field is perpendicular to the direction of propagation. This condition is essential for obtaining the non-reciprocal effect in the material. The Assignee has observed that, in such a structure, frequency bandwidth is larger than that in non-reciprocal devices based on propagation in the TEM mode.

Many experiments aimed at increasing the bandwidth of non-reciprocal devices have been described in the technical literature, and many devices utilising the microstrip technique have already been produced. There may be mentioned by way of non-limiting example U.S. Pat. Nos. 3,555,459 and 3,617,951 to R. Anderson, in which wideband non-reciprocal devices utilising the microstrip technology are described. It is clearly specified in the text of these specifications, for instance in U.S. Pat. No. 3,617,951 column 2, lines 4, 5, 20 et. seq., that the desired mode is the TEM space mode and that the bandwidth is obtained (1) by using a ferrite operating as a non-resonating cavity, and (2) by eliminating the parasitic modes (mode suppressors are provided in most of the constructions). Likewise, in column 3, line 29, the TEM space mode is used as reference for the determination of the impedances. None of the prior art devices rely on surface wave propagation.

BRIEF DISCLOSURE OF THE INVENTION

The present invention concerns non-reciprocal devices operating at very high frequencies and ultra-high frequencies and in higher frequency bands, which comprises at least one set of the following elements:

— a structure supporting the propagation and consisting of at least one part of magnetic material with gyromagnetic properties of characteristics of $\mu_{fo}$ and $\epsilon_f$ at zero external magnetising field, having its largest dimension parallel to the direction of propagation and two other dimensions small in relation thereto;

— a device which sets up a substantially homogeneous unidirectional magnetic field perpendicular to the direction of propagation in at least a fraction of the said magnetic medium, so that the value of $\mu_f$ is large in relation to $\mu_{fo}$ in one direction of propagation and small in relation to this value in the opposite direction. The dimensions of the structure are so designed as to contain almost all the energy in the direction of propagation which is called the direct or forward direction;

— an input and an output serving as the interconnections with the associated circuits;

— a wave transformer which transforms the incoming TEM waves into surface TM or quasi-TM or hybrid $HE_{11}$ waves, and the surface waves into outgoing TEM waves.

The structure employed for the propagation comprises at least a part consisting of magnetic material. For some surface wave modes, such as the hybrid $HE_{11}$ mode, this part may constitute the whole of the structure. As has been stated above, the magnetic field has in fact a non-planar polarisation, which ensures an interaction with the magnetising field. The latter is zero when the wave is planar, owing to the orientation of the magnetising field which is fixed by the technique of production as perpendicular to the propagation direction. In other surface wave modes, it is necessary to help the establishment of a non-rectilinear polarisation of the elternating magnetic field. This is obtained by associating a dielectric medium with the magnetic medium, in such manner that the surface at which the two media are joined contains the direction of propagation and that the composite structure thus constituted is electrically continuous in one direction of propagation, failing which high insertion losses will be introduced. The continuity of the medium is expressed by the condition $$\mu_{fo}\,\epsilon_f \;\#\; \mu_e \cdot \epsilon_e$$

where $\mu_e$ and $\epsilon_e$ re the characteristics of the dielectric ($\mu_e = 1$ in practice).

In some embodiments, the structure serving for the propagation may be associated with a conductor whose form is adapted to its own. The structure thus obtained is analogous to that of a Harms-Goubau conductor for a structure in the form of a solid of revolution; in the case of a planar structure, it ressembles that called a "Harms-Goubau slab" by H. Kaden in the article "dielektrische und metallische Wellenleiter" published in the review "Archiv fur elektrische Ubertragung," August 1952, pages 319 – 332. This structure is formed of an unlimited conductive plane on which there lies an insulating layer, along which surface waves travel. In the present case, the homogeneous or composite medium is necessarily limited, whereby the TM mode of propagation is changed to a quasi-TM or substantially hybrid $HE_{11}$ mode. However, the conductive plane is not essential to the construction of the devices according to the invention, as will become apparent from the following description.

The geometrical shape of the medium, whether homogeneous or not, may be varied as desired, provided that the electrical parameters meet the abovementioned condition. More particularly, examples of plane and cylindrical structures will be given. A general theoretical explanation of the propagation of TM or quasi-TM surface waves and hybrid surface waves, for example of the $HE_{11}$ type, in the homogeneous or composite medium used in the embodiments of the invention is too complex to be set out here. The complete mathematical theory leads to transcendental equations. The tentative theory of H. Kaden (see the abovementioned article) is limited to a medium of permittivity $\epsilon$ and of constant permeability $\mu = 1$ (nonmagnetic). This simplified assumption rapidly leads to transcendental equations. When the medium is magnetic, the study is even more complex. Formulae corresponding to a particular case are given at the end of the description.

The wave transforming devices necessary for establishing surface waves in the homogeneous or composite structure are well known per se. Various examples of such transformers intended for cylindrical structures are disclosed in French Pat. No. 1,113,753 applied for on Mar. 21, 1951 by G. Goubau. Transformers are also known which are better adapted to plane structures and are derived directly from those described in the article by Messrs. Chavance and Chiron already referred to.

The anisotropic character of the magnetised ferrimagnetic material produces a spreading of the h.f. energy for one direction of propagation that is an increase of the space factor. In the case of devices utilising anisotropy for the purpose of producing an attenuation of the energy in said one direction of propagation, the undesired energy must be absorbed, unless it will interfere with the operation of neighbouring devices. These devices are therefor provided with an absorber or load in association with the structure serving for the propagation whether homogeneous or not an element which absorbs the h.f. energy. When the devices according to the invention utilise the anisotropy of the magnetic material for the purpose of producing a non-reciprocal phase shift, all of the energy must be retained in the structure in both directions of propagation. It is then necessary to employ a composite structure and this condition is taken into account in the calculation of the geometrical dimensions. No absorber is required.

ADVANTAGES OF THE INVENTION

In the devices according to the present invention, the transmitted bandwidth is very considerably wider than that in the devices of the prior art, because, as has been found from experience and as may be shown by an approximate formula (cf. the end of the disclosure), such structures have no cut-off frequency at the upper end of the band, but only a threshold frequency, which depends only upon the electrical and geometrical characteristics of the propagation medium or of the medium plus the conductive plane. The higher parasitic modes which could be excited are readily attenuated by known means such as metal plates or wires perpendicular to the components of the h.f. electric field. Experience shows that the useful frequency bandwidth may exceed four octaves without any special precautions having to be taken. Such a bandwidth must obviously be transmitted by all the parts of the devices according to the invention, notably the wave transformer and the input and output couplers.

The improvement in the energy behaviour of the devices according to the invention over those of the prior art lies on several features of the invention. Of course, it applies only to devices in which non-reciprocal attenuation is utilised. The most easy to explain is that resulting from the very position of the absorber usually called an attenuator. The latter is located outside the propagation medium and is therefore surrounded by air on all its faces except that one which is in contact with the propagation structure. It can occupy a volume compatible with the effective dissipation of the heat without affecting the direct losses, since in this direct direction almost all the energy is concentrated along the homogeneous or composite medium and a very small fraction propagates in the space where lies the attenuator. Such an attenuator can therefore ensure higher temperature stability for a given energy level, or dissipate much more power with a given temperature rise.

When the medium employed is composite, it behaves overall as an anisotropic medium due to the anisotropy of the magnetic material part. The geometrical parameters of the one or both parts are so chosen that almost all the energy is concentrated in the medium for propagation in the forward direction. The anisotropy of the magnetic medium results in a spreading of the energy in the case of propagation in the reverse direction. The mismatch depends upon the variation of $\mu_f$ in the forward direction and in the reverse direction, and it is obvious that the nature of the magnetic material and the magnetising field are set so as to obtain a maximum variation. The variation of $\mu_f$ also generally results in a preferential concentration of energy of the reverse wave around only one of the two parts, because the two parts then have very different impedances and propagation exponents. Indeed the characteristics of the dielectric part do not vary with the direction of propagation. The part which serves as a support for the reverse wave is no longer so dimensioned as to ensure alone an optimum propagation: the dimensions of its section, perpendicular to the direction of propagation are too small. It is well known that any surface wave transmission line can be used as a radiating element. In order to obtain this result, it is sufficient to introduce either a geometrical discontinuity or an electrical discontinuity into the transmission line. A discontinuity of any nature acts essentially, in the case of a surface wave, as a radiating source and not as a source of reflecting energy as in the case of the other types of guided propagation waves. Consequently, this part behaves with respect to the reverse wave as a radiating element, owing to the considerable electrical mismatch which is set up in the reverse direction in the cross-section of the medium.

This effect is combined with the overall variation of the electrical characteristic of the medium due to the anisotropy so as to increase the non-reciprocity. More particularly, the surface wave radiated in the reverse direction propagates outside the medium and in the case of isolators it is absorbed by the attenuator.

When the direction of the magnetising magnetic field is reversed, the non-reciprocity of the structure is, of course, retained and the forward and reverse characteristics are interchanged. By using constant but non-uniform magnetising fields throughout the magnetic part of the structure, it is possible to obtain transmission characteristics between one of the ends of the structure and an intermediate point corresponding to the discontinuity of the magnetising field which are different from the transmission characteristics between the said intermediate point and the other end of the structure. This observation is used as a basis in the design of particularly simple wide-band circulator devices having much smaller insertion losses than the known circulators. As will hereinafter be apparent, the structure then comprises a number of magnetic parts and a number of dielectric parts.

The attenuator generally takes the form of a partial or continuous deposit of a carbon-based mixture, in the well-known manner. The attenuator is in contact with that part of the medium along which the reverse wave propagates or on the whole of the composite medium. It will be seen from the embodiments that depending on the design the energy of the reverse wave propagates in the neighbourhood of one part of the composite medium or the other. The attenuator material is so chosen as to have high permittivity and even high permeability. In this case, the attenuator performs not only the desired absorbing function, but it may contribute to some extent to the extraction of the radiated or guided energy from the medium.

With regard to the materials employed in the homogeneous or composite medium according to the invention, the range of commercially available materials usually makes it possible to choose a material on the basis of its losses in the operating frequency band. However, the choice of the magnetic material is based primarily on the value of its saturation induction. In order to obtain a forward attenuation characteristic which satisfies the lowest frequency of the bandwidth, it is necessary for the saturation induction to be small. On the other hand, in order to obtain a substantial difference between the permeabilities of the material in the two directions of propagation, it is generally necessary for the saturation induction to be high. Experience has shown that the low-field loss characteristic must be given primary consideration. It is well known that the saturation induction of ferrite is related to the frequency of operation by the following inequality:

$$F(\text{MHz}) > 2.8\ (4\pi Ms + Hc)$$

in which $Ms$ is the saturation magnetisation, and $Hc$ is the anisotropy field, $F$ is the frequency measured in MHz. This inequality stands valid for a very weak magnetising field. Now, it is generally desirable to be able to reduce the magnetising field in such manner as to reduce the weight and the overall dimensions of the magnet. By way of example, it will be recalled that the saturation induction of pure iron yttrium garnet is 1,680 G, which corresponds to a minimum frequency of operation of 4,700 MHz with a weak magnetising field. In the case of a Gd-or Al-substituted iron-yttrium garnet, the induction is reduced in a ratio of about 5:1, which renders possible operation under optimum conditions from 1,000 MHz.

With regard to he dielectric, it is desirable to choose a material whose loss tangent is as small as possible in the operating frequency range and which generally has a permittivity matching that of the magnetic material. In the case of the above-mentioned garnets, this value is in the neighbourhood of 15. The most usual dielectrics (alumina — beryllia — titanates) may be suitable. There may also be mentioned the dielectrics with a spinel structure which are disclosed in the French Pat. No. 2,070,436 assigned to the present Assignee on Dec. 4, 1969, which may be advantageous, especially if the magnetic material chosen has the same crystal structure.

With regard to the surface wave transformer, the above-mentioned articles serve as a basis for its calculation and the optimum design in each particular case can be empirically determined. As will be seen from the embodiments, in some cases it is preferable to employ a continuous transformer extending from the input to the output couplers. In other variants, the excitation of the surface waves and their transformation are achieved by two separate transformers, generally or like shape. These devices are either conductors or may incorporate insulators. They are preferably planar so as to permit the integration of devices according to the invention which is aimed at by all designers of microwave circuits in order to meet a reduction of the space and of the weight requirements.

DETAILED DESCRIPTION OF THE INVENTION

Figure 1:
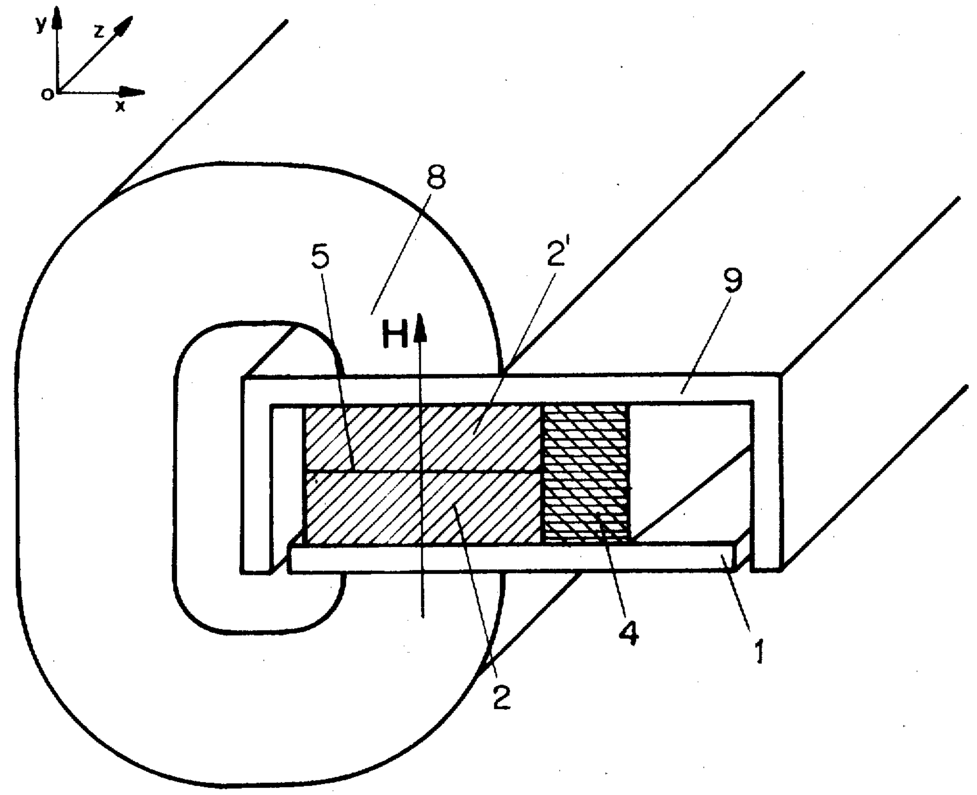

The invention will be readily understood from the following description and from the accompanying drawings, in which:

FIG. 1 is a diagrammatic view in perspective and

Figure 1A:
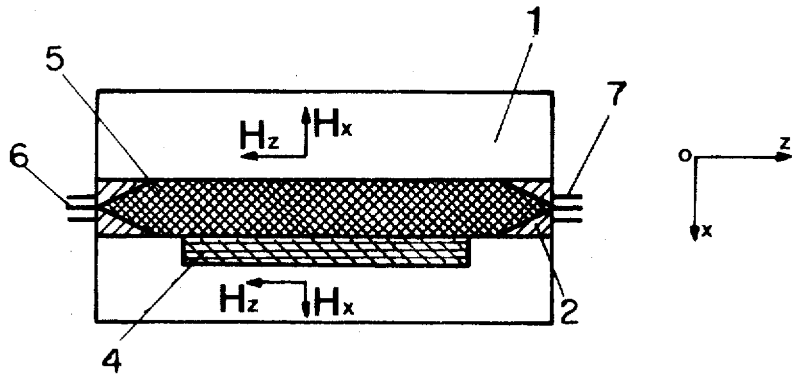
Figure 2:
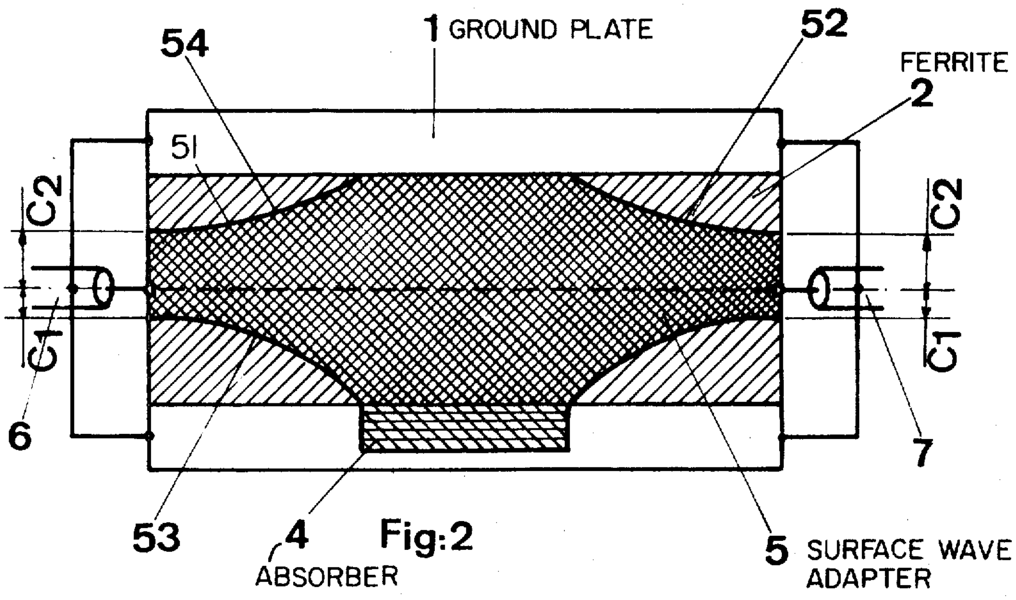
Figure 3:
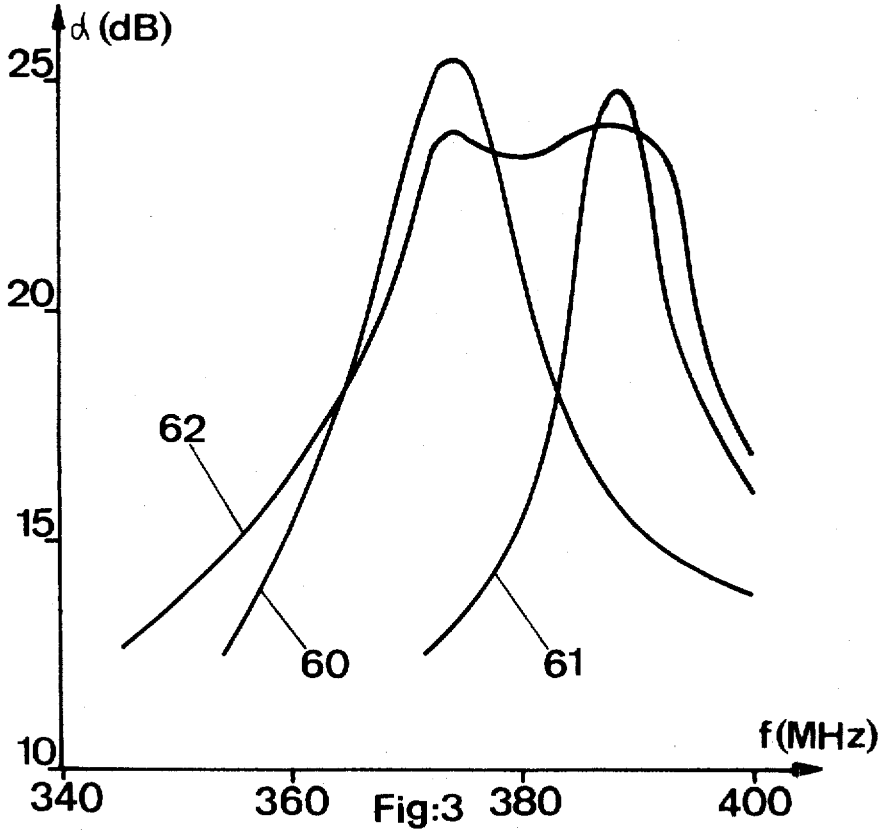
Figure 4:
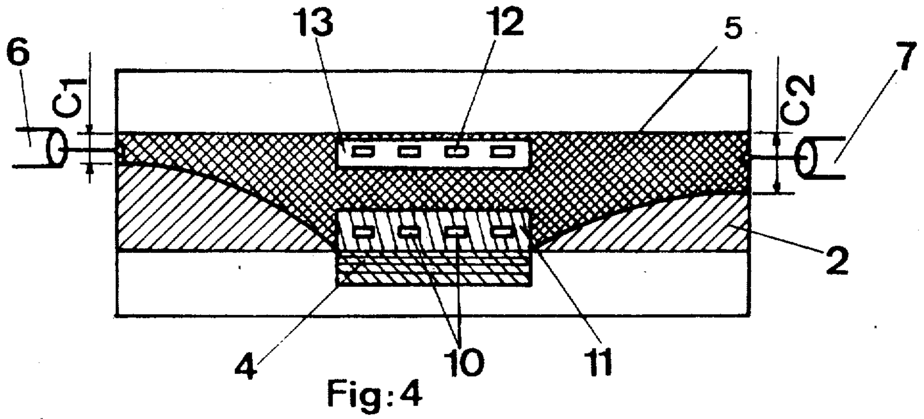
Figure 5:
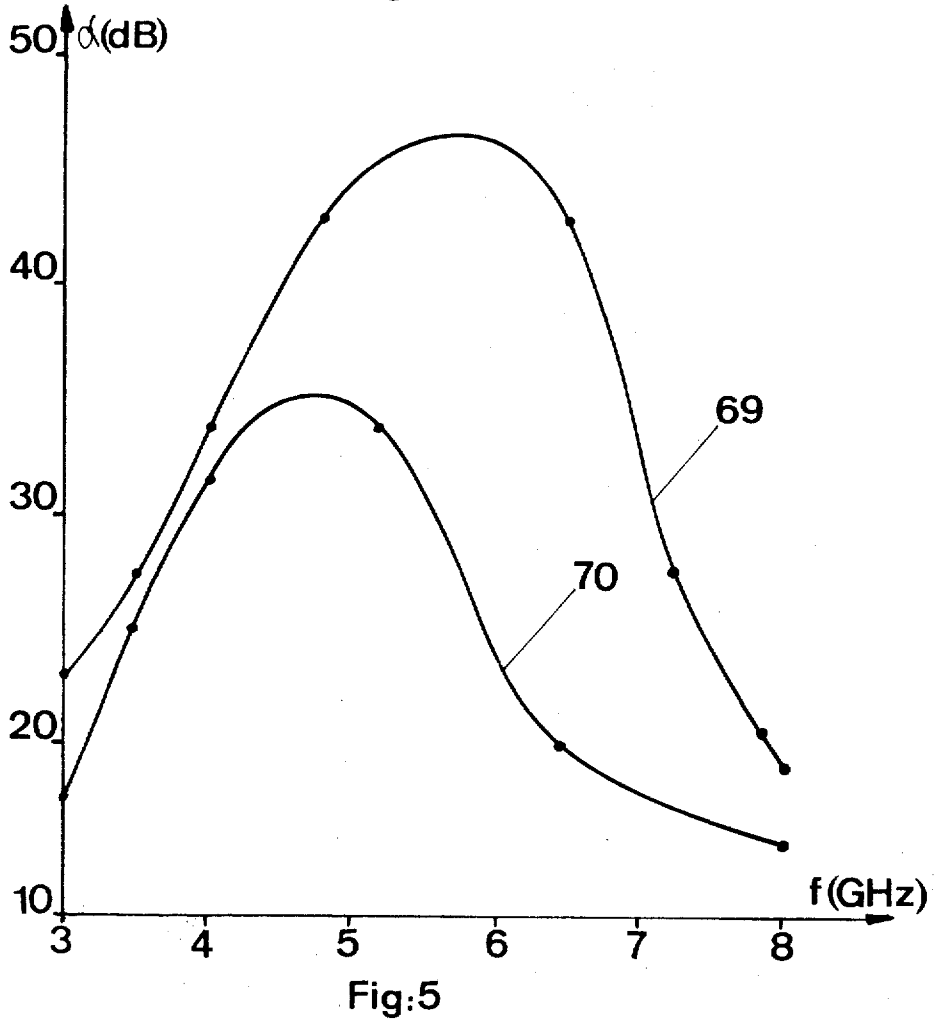
Figure 7:
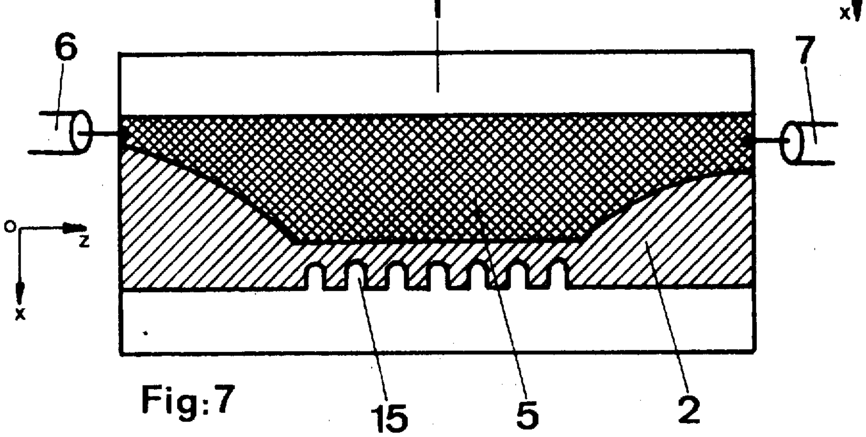
Figure 8:
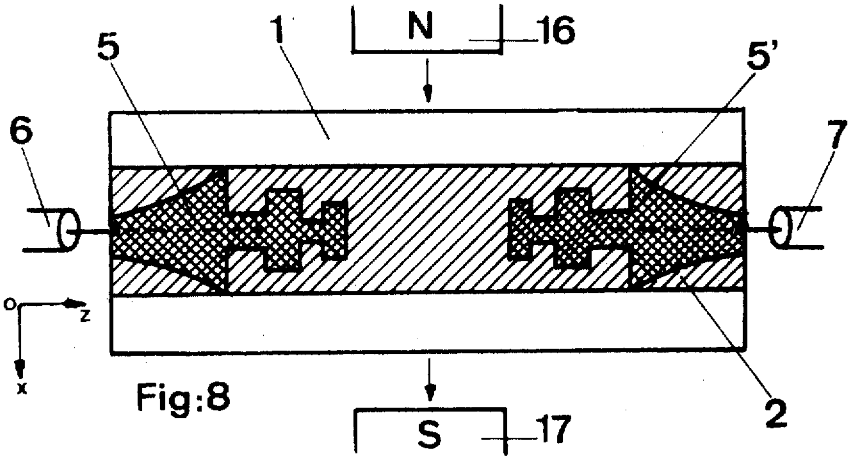
Figure 9:
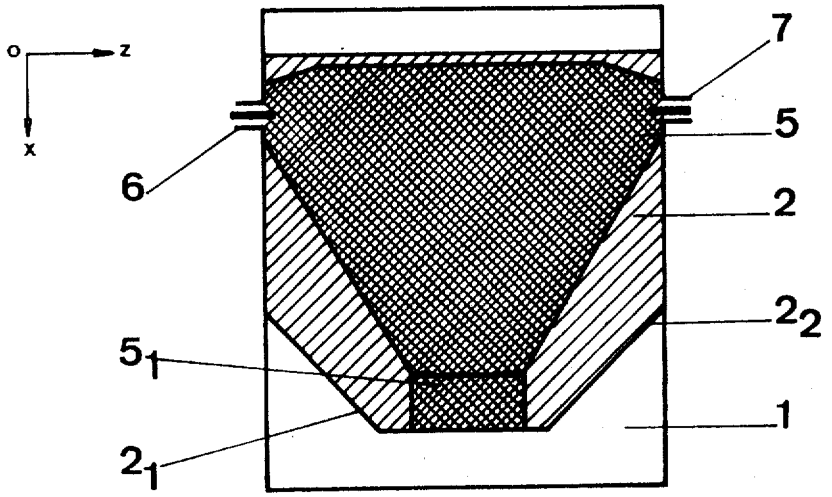
Figure 10:
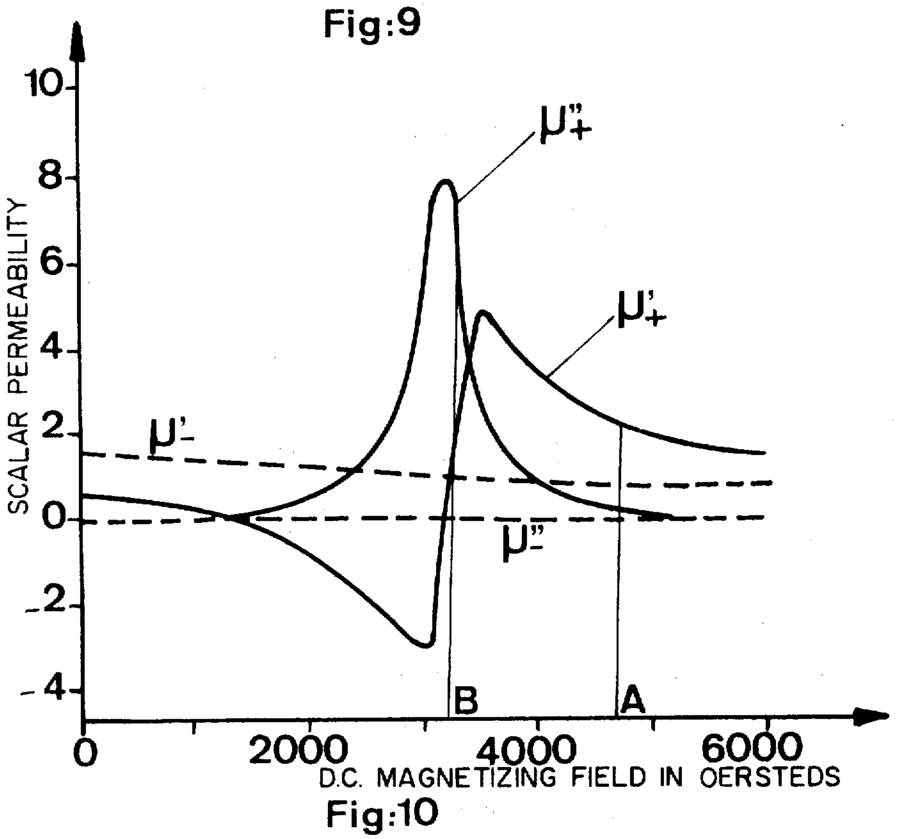
Figure 11:
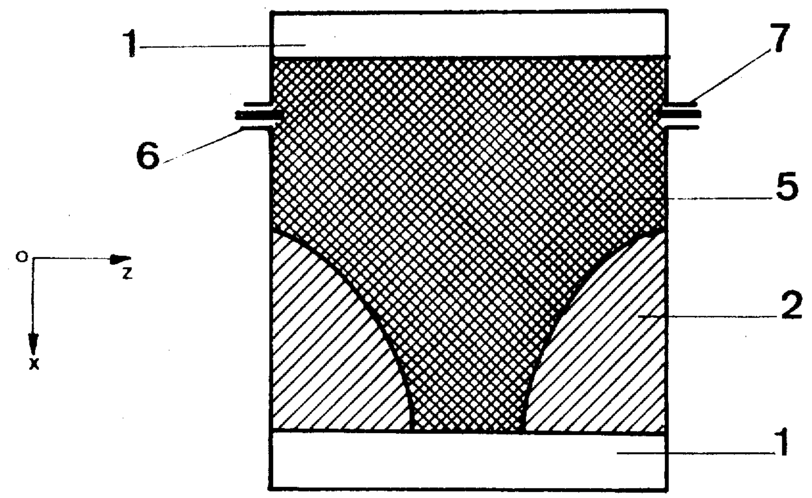
Figure 13:
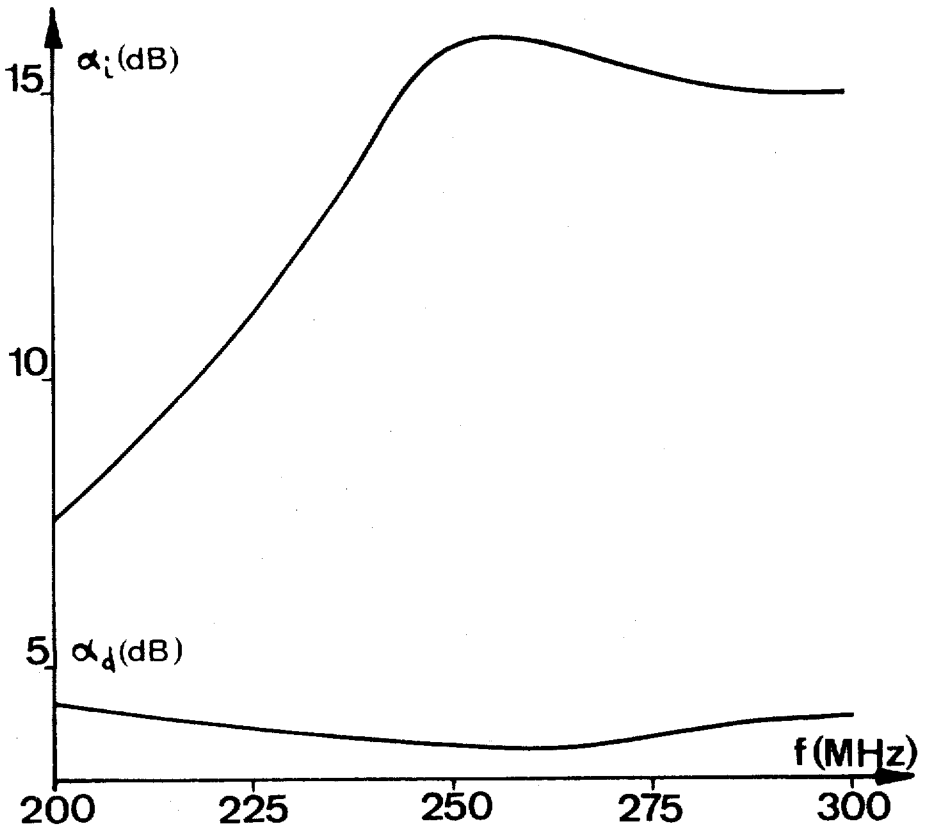
Figure 12:
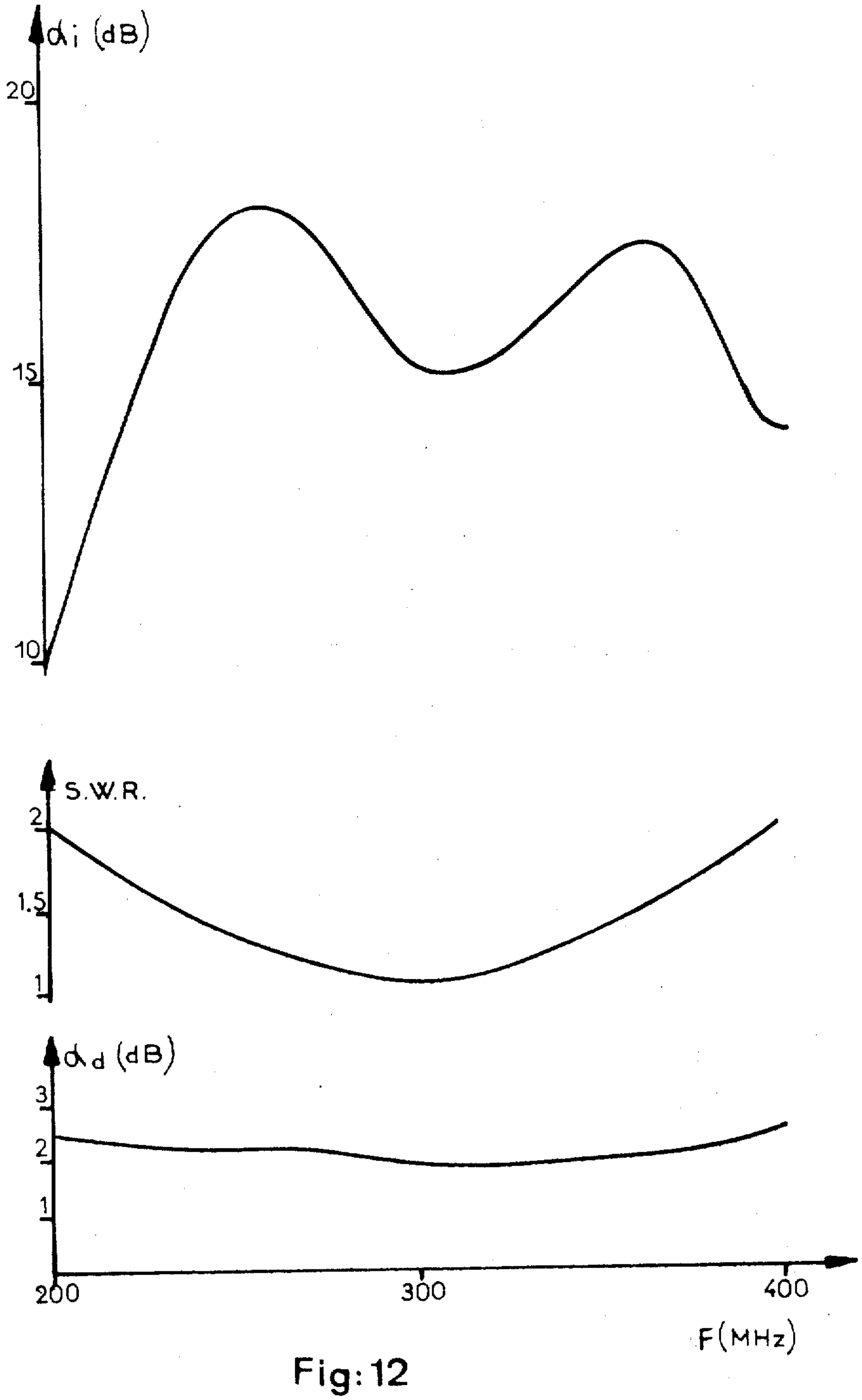
Figure 14:
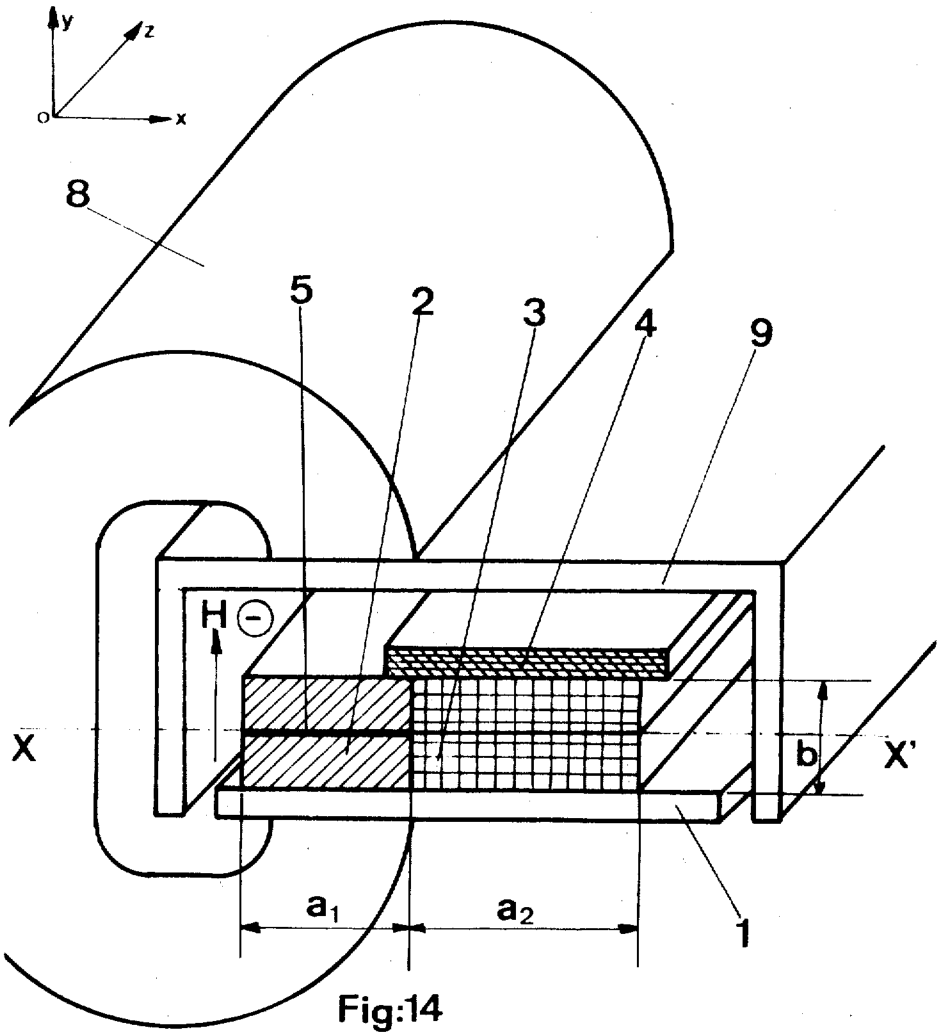
Figure 14A:
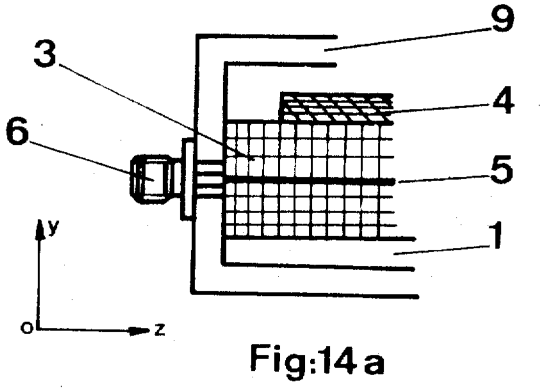
Figure 15:
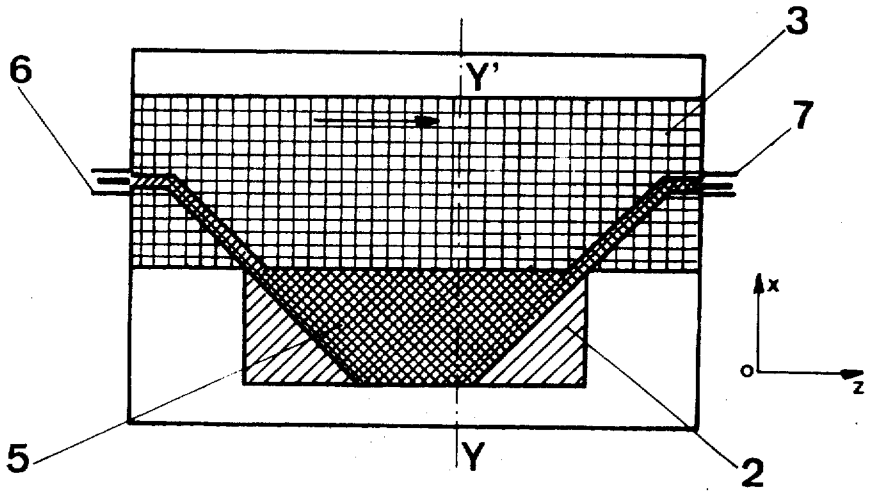
Figure 16:
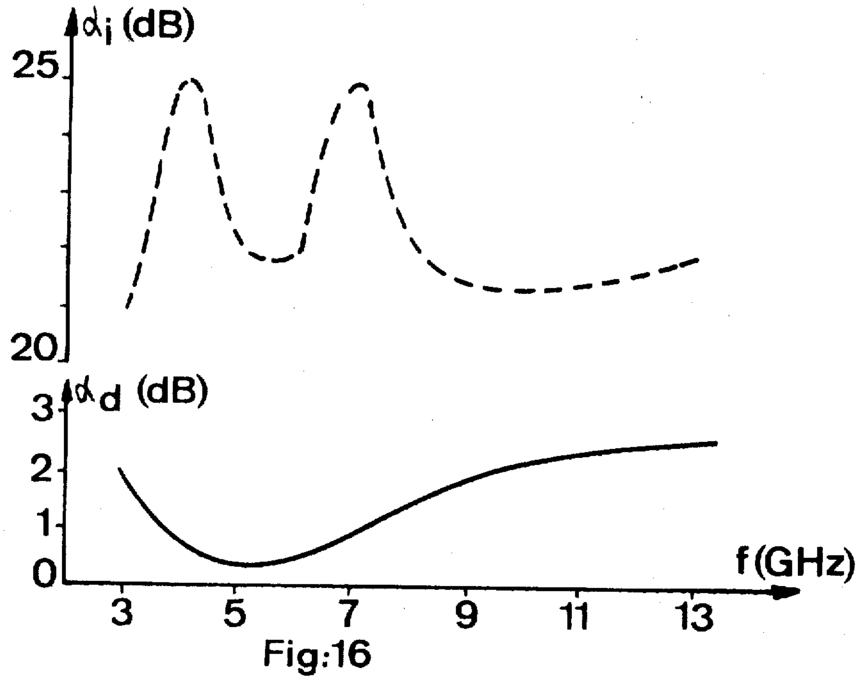
Figure 17:
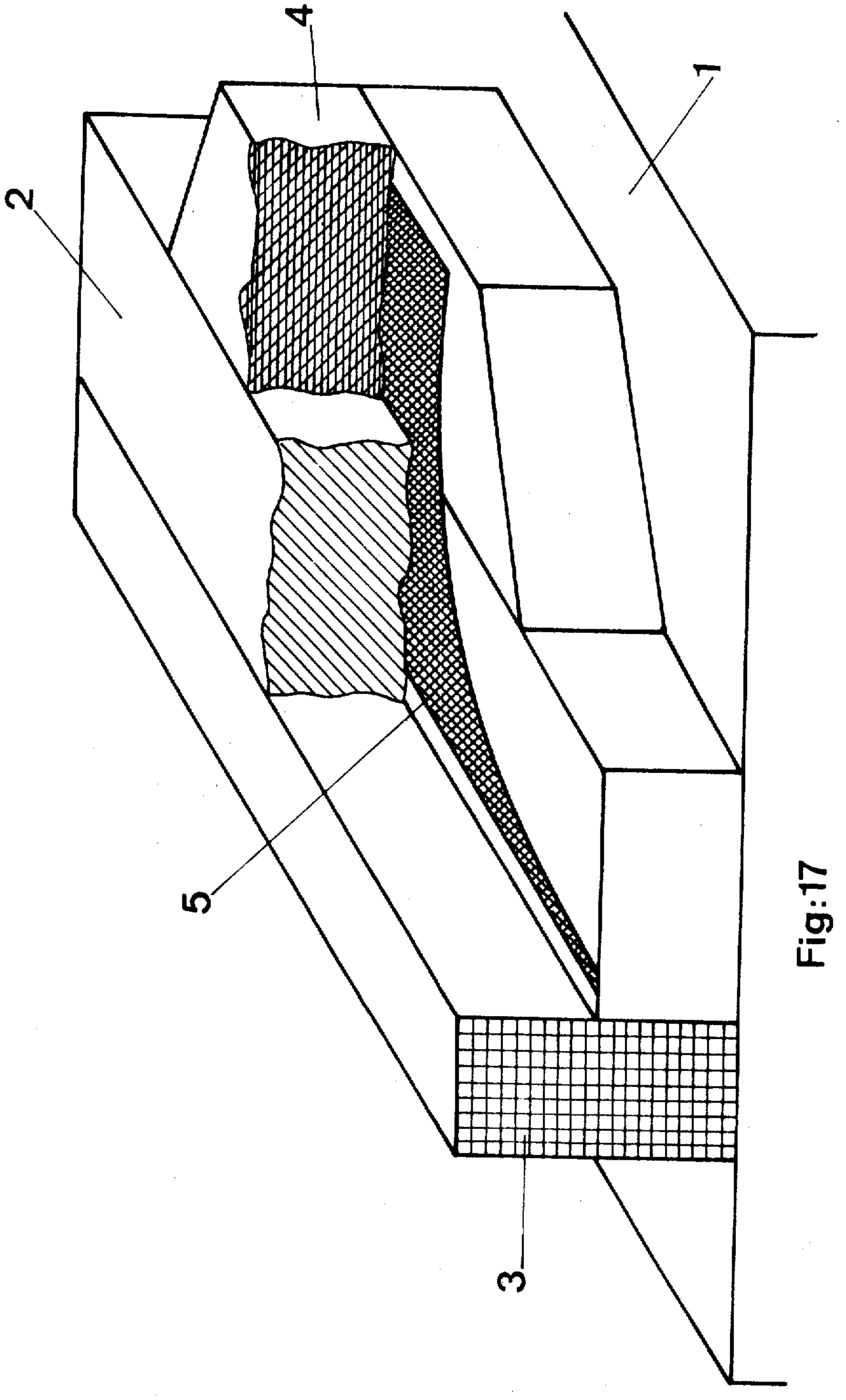
Figure 17A:
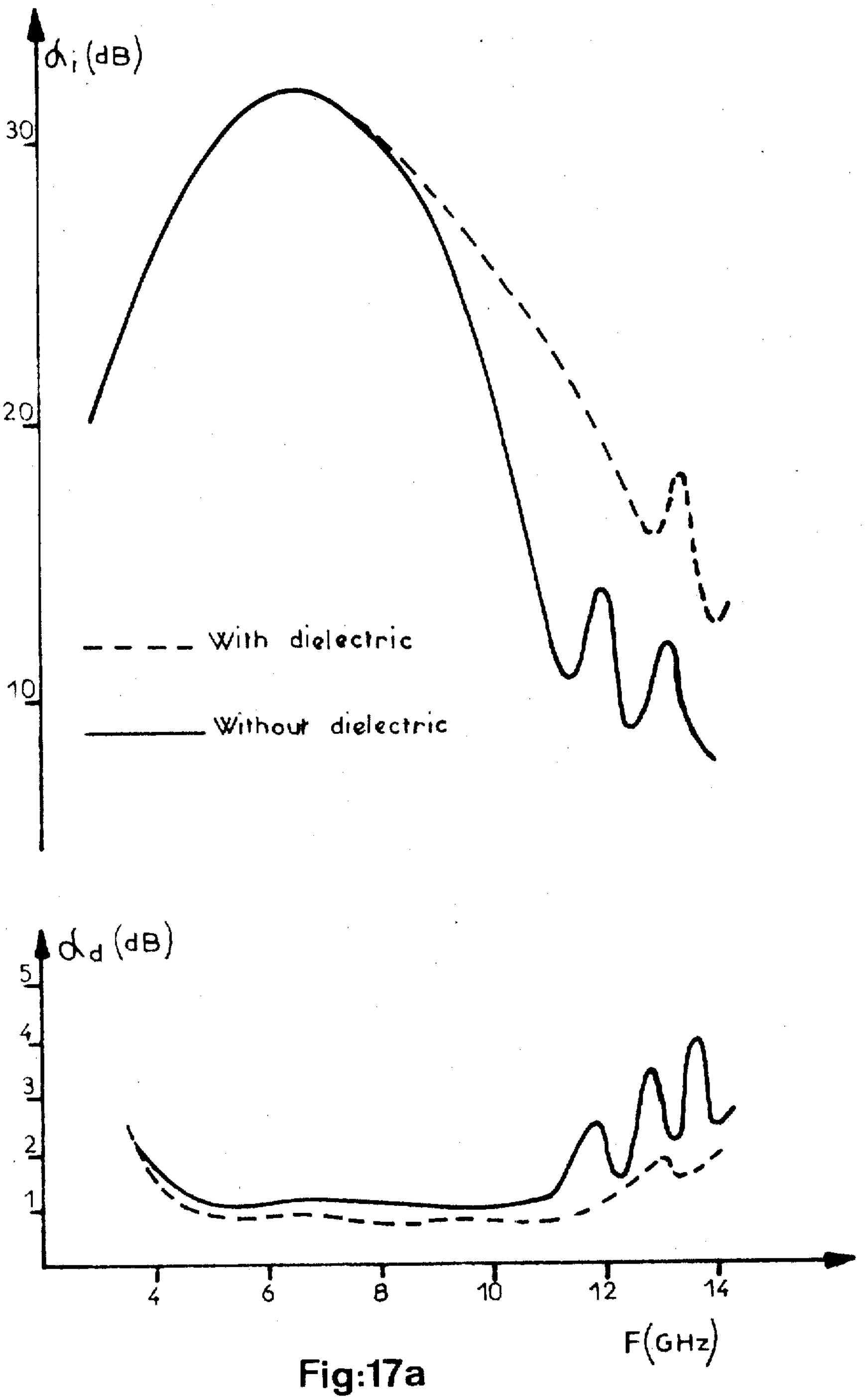
Figure 18:
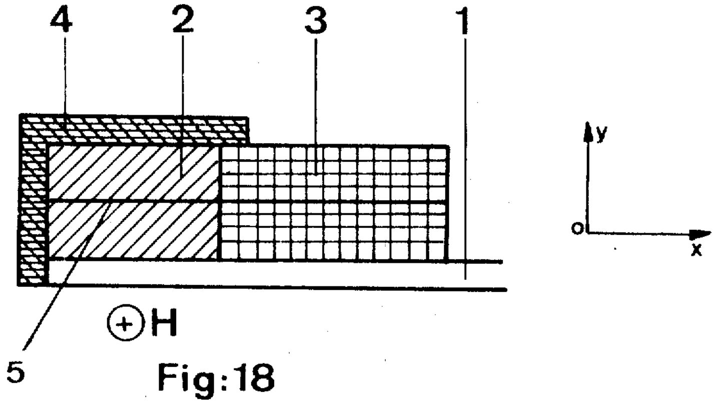
Figure 18A:
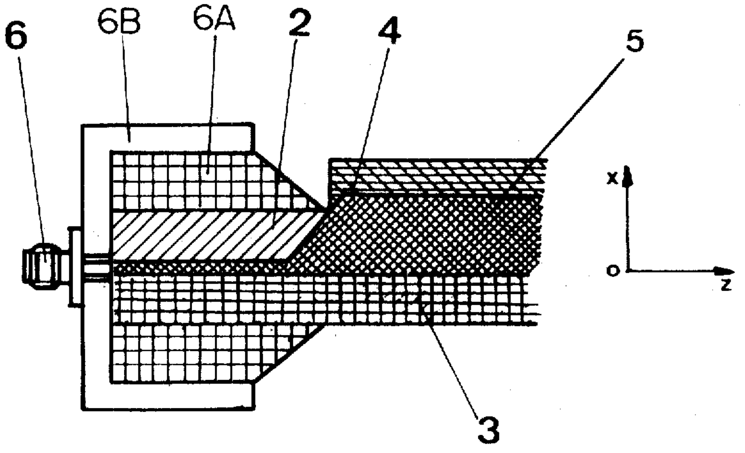

FIG. 1a is a longitudinal sectional view of a first type of isolator encorporating a homogeneous propagation support, FIG. 2 is a variant of the wave adapter for the isolator of FIG. 1, FIG. 3 is a curve relating to the operation of the wave adapter of FIG. 2, FIG. 4 is a variant of FIG. 2, FIG. 5 is a curve relating to the operation of the wave adapter of FIG. 4, FIGS. 6, 6a 7 and 8 illustrate variants of the wave adapter of the device of FIG. 1, FIGS. 9 and 11 illustrate modified constructions of isolators without external attenuator, FIG. 10 comprises two curves facilitating the understanding of the operation of the isolators of FIGS. 9 and 11, FIGS. 12 and 13 are the characteristic curves of the isolators of FIGS. 9 and 11 respectively, FIGS. 14 and 14a are two views of a second type of isolator according to the invention, utilising a composite propagation support, FIG. 15 illustrates a variant of a wave adapter for the structure of FIG. 14, FIG. 16 is the characteristic curve of the isolator of FIG. 14, FIG. 17 shows a variant of the isolator according to FIG. 14, FIG. 17a shows the characteristic curves of the device of FIG. 17, FIG. 18 shows a modified construction of an isolator according to FIG. 14, FIG. 18a illustrates the interconnection of the wave adapter of the isolator of FIG. 17 with the coaxial plug.

Figure 19:
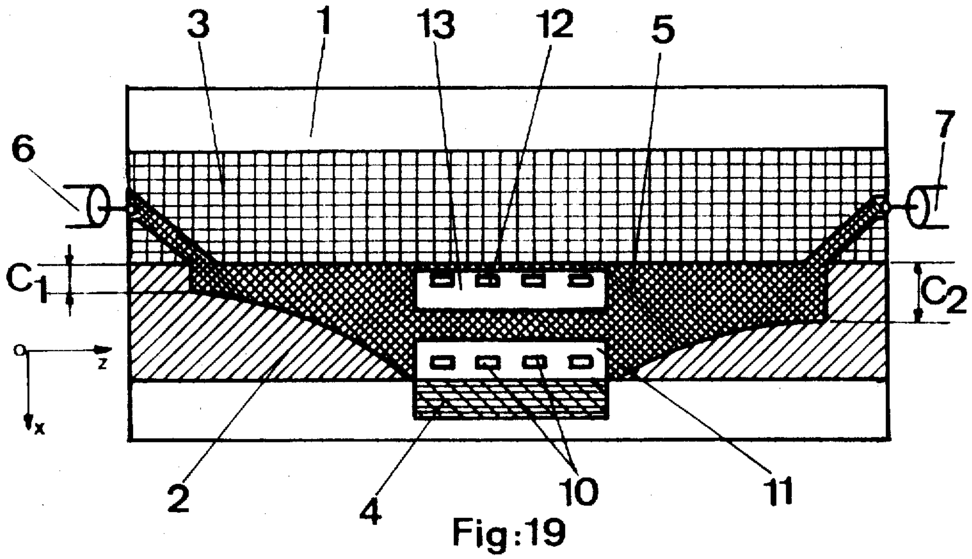
Figure 20:
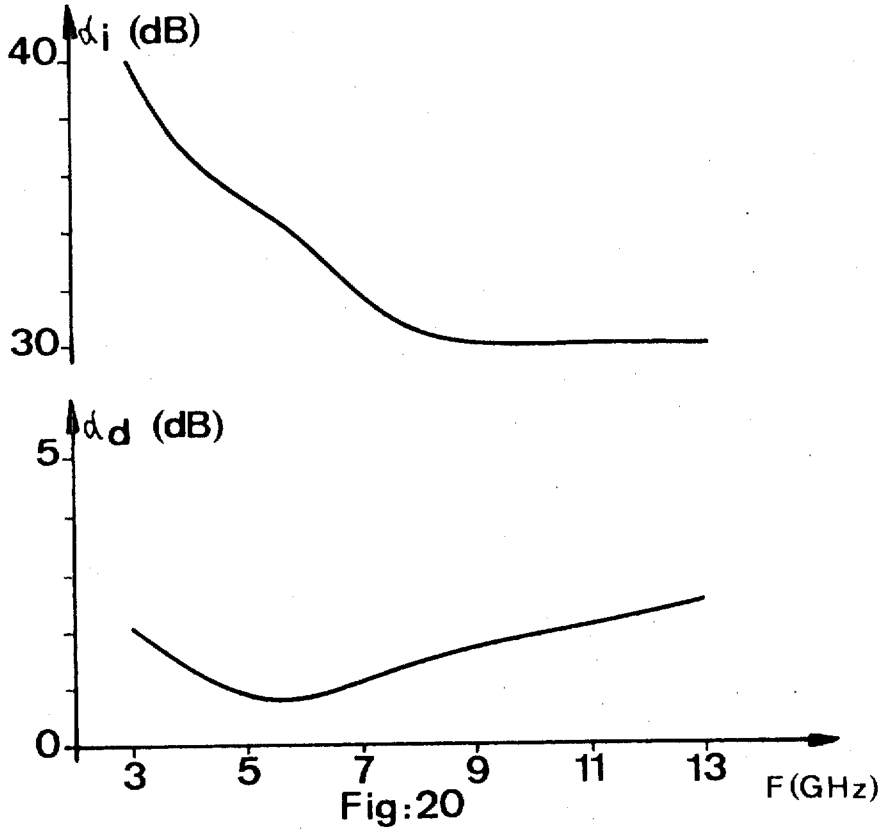
Figure 21:
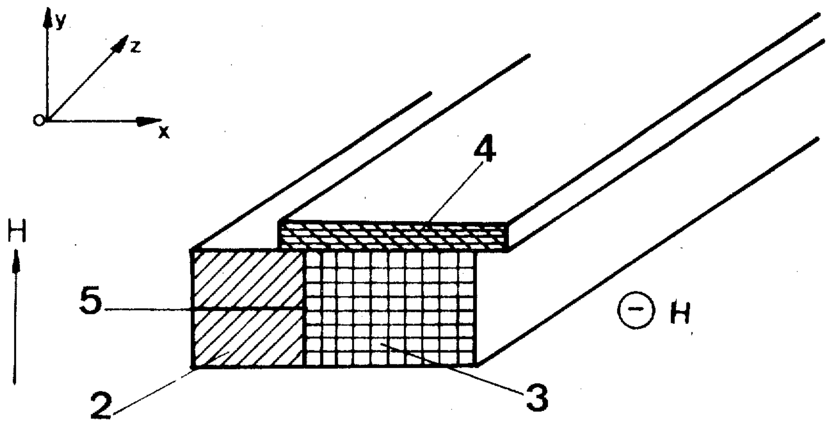
Figure 22:
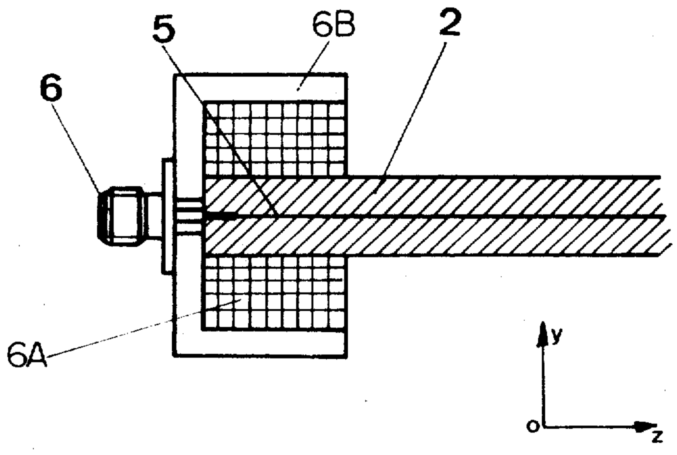
Figure 23:
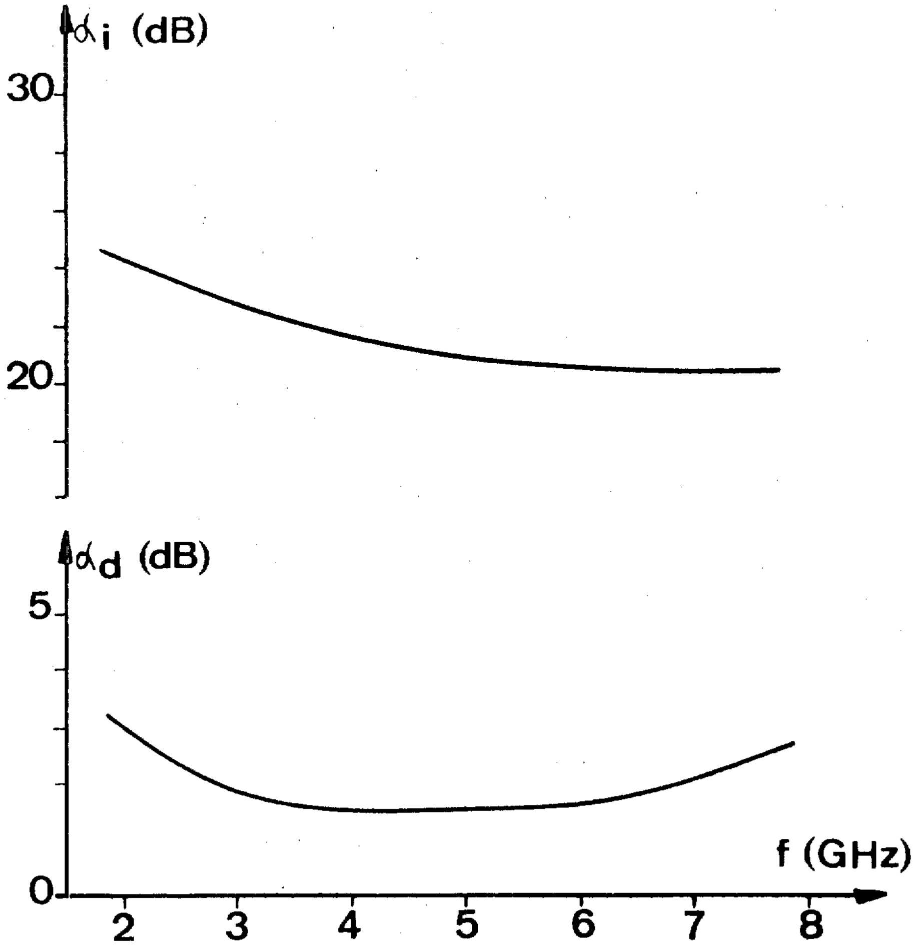
Figure 24:
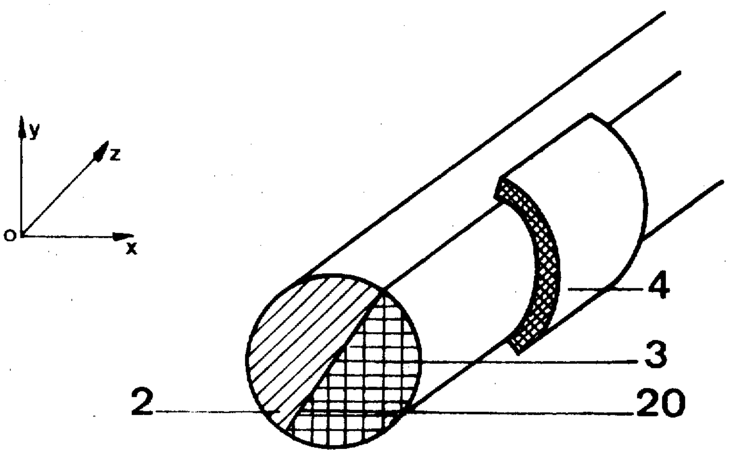
Figure 25:
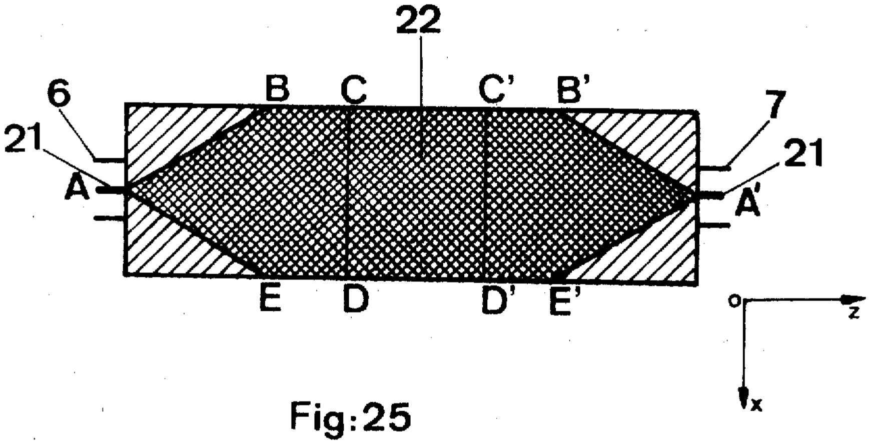
Figure 26:
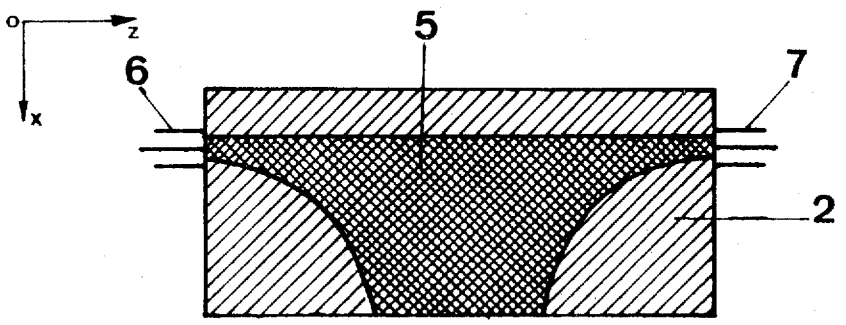
Figure 27:
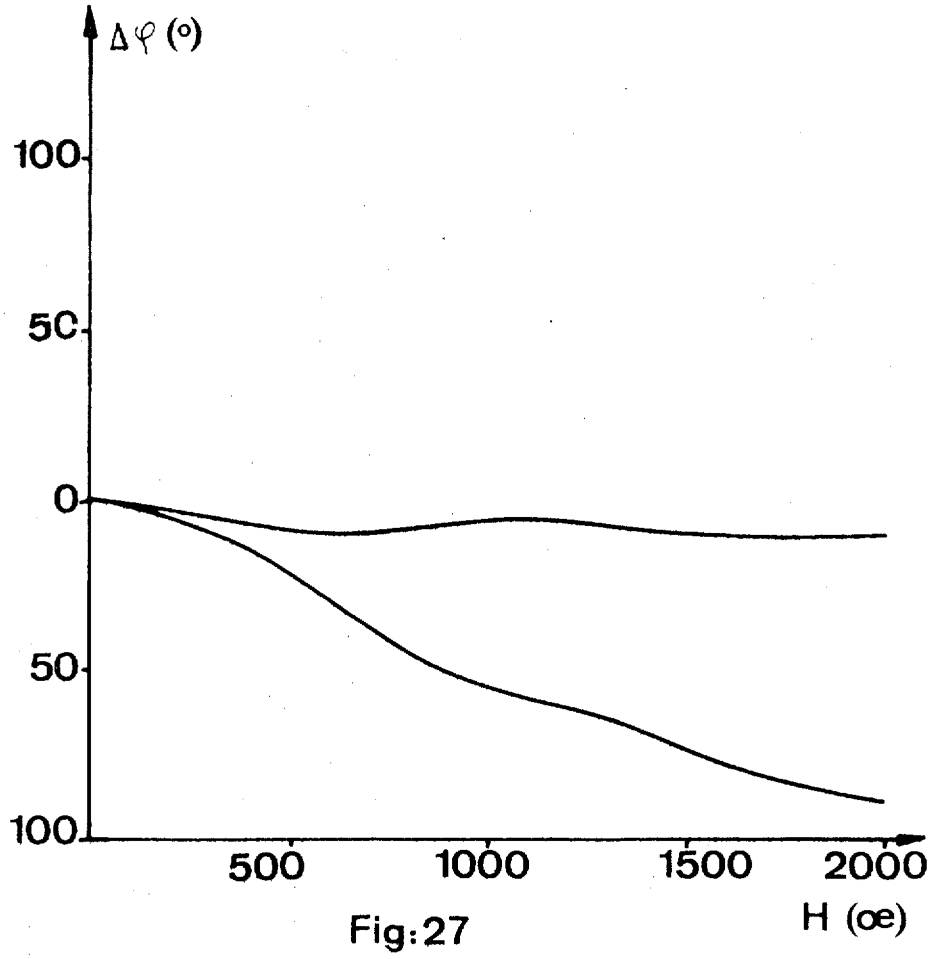
Figure 28:
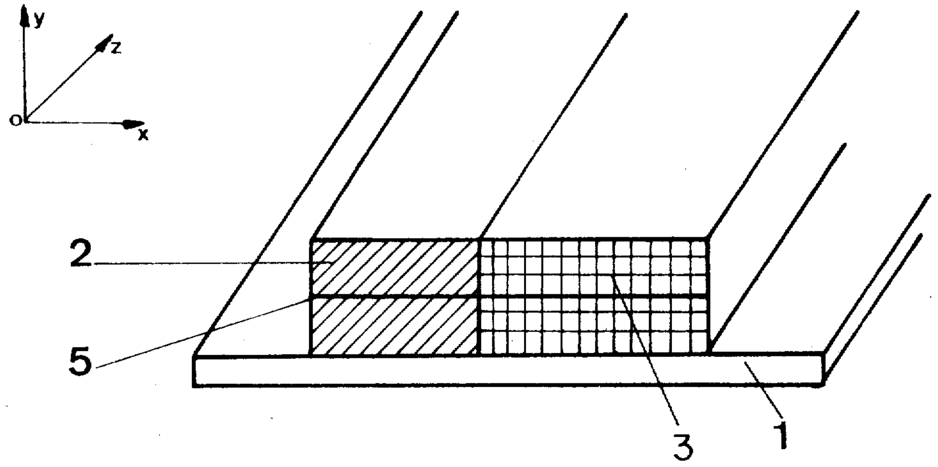
Figure 29:
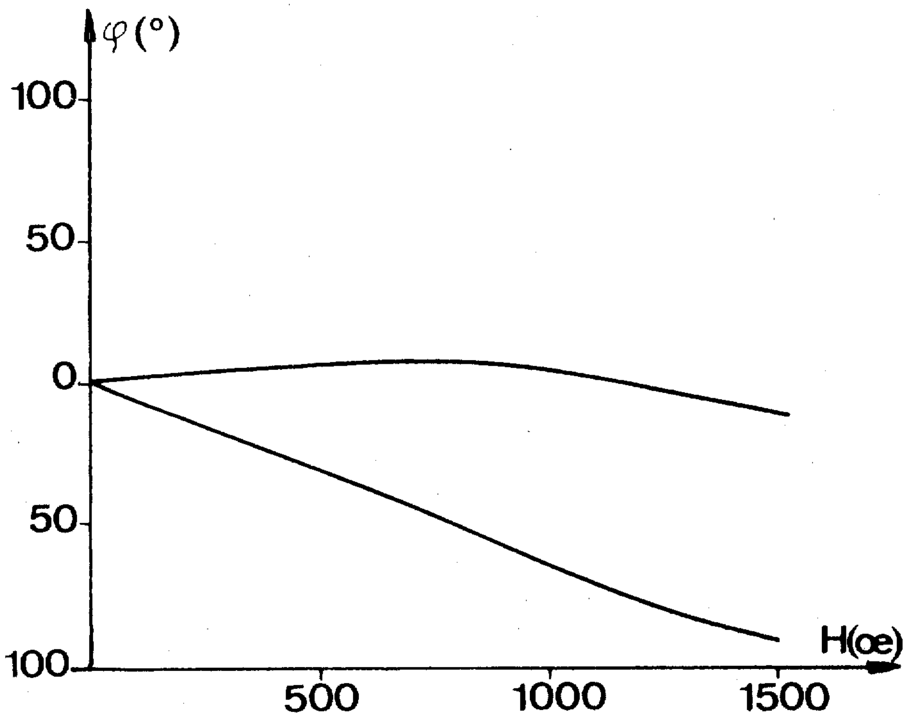
Figure 30:
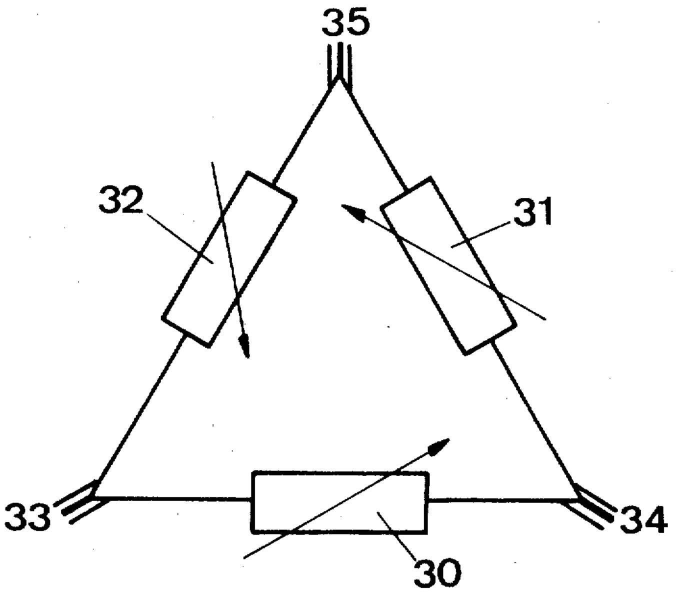
Fig: 30 PRIOR ART
Figure 31:
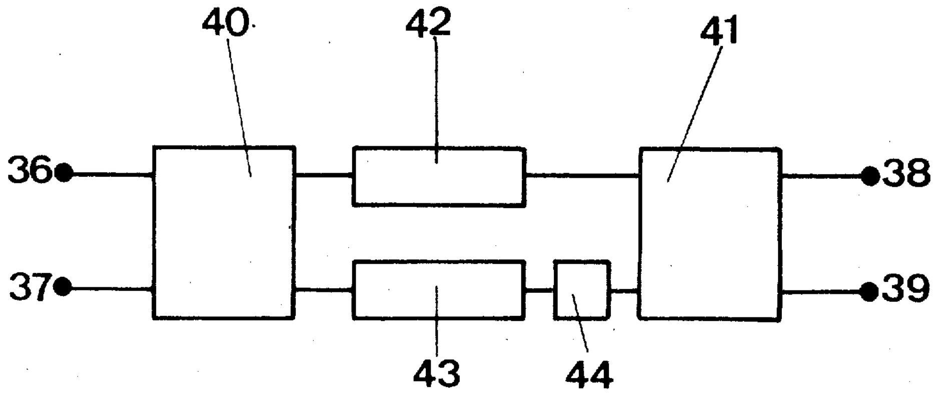
Fig: 31 PRIOR ART

FIG. 19 illustrates a modified construction of the wave adapter of the isolator of FIG. 17, FIG. 20 is a characteristic curve of an isolator according to the figure FIG. 21 is a diagrammatic representation of a third type of isolator according to the invention without a ground plane, FIG. 22 illustrates the interconnection of a wave adapter for a structure according to FIG. 21, FIG. 23 is a characteristic curve of an isolator according to FIG. 21, FIG. 24 illustrates an isolator of cylindrical structure, FIG. 25 illustrates a wave adapter for an isolator according to FIG. 24, FIG. 26 illustrates a phase shifter structure having a homogeneous magnetic propagation support, FIG. 27 is the characteristic curve of the phase shifter of FIG. 26, FIG. 28 illustrates a structural variant of the phase shifter with a composite propagation support, FIG. 29 is the characteristic curve of the phase shifter of FIG. 28, FIGS. 30 and 31 are block diagrams of known circulator structures which can be designed with the phase shifters of FIGS. 26 or 28.

Figure 32:
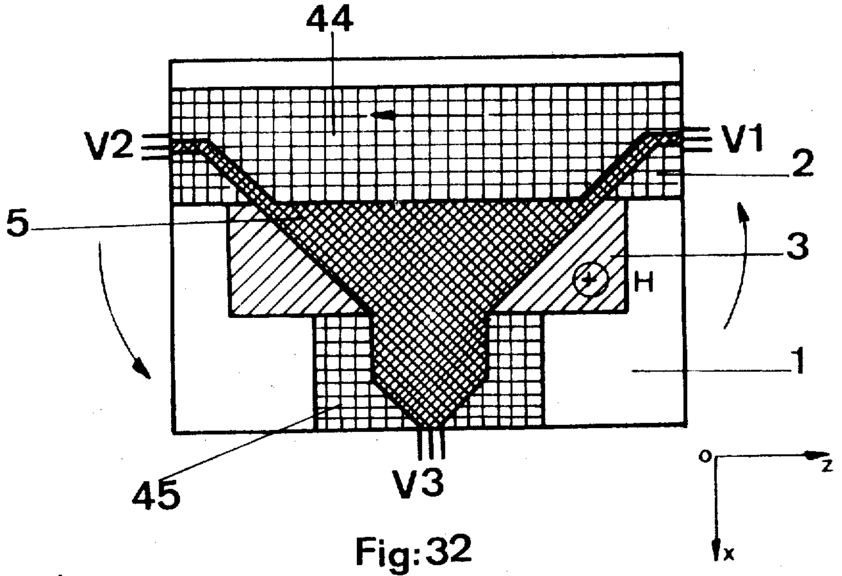
Figure 33:
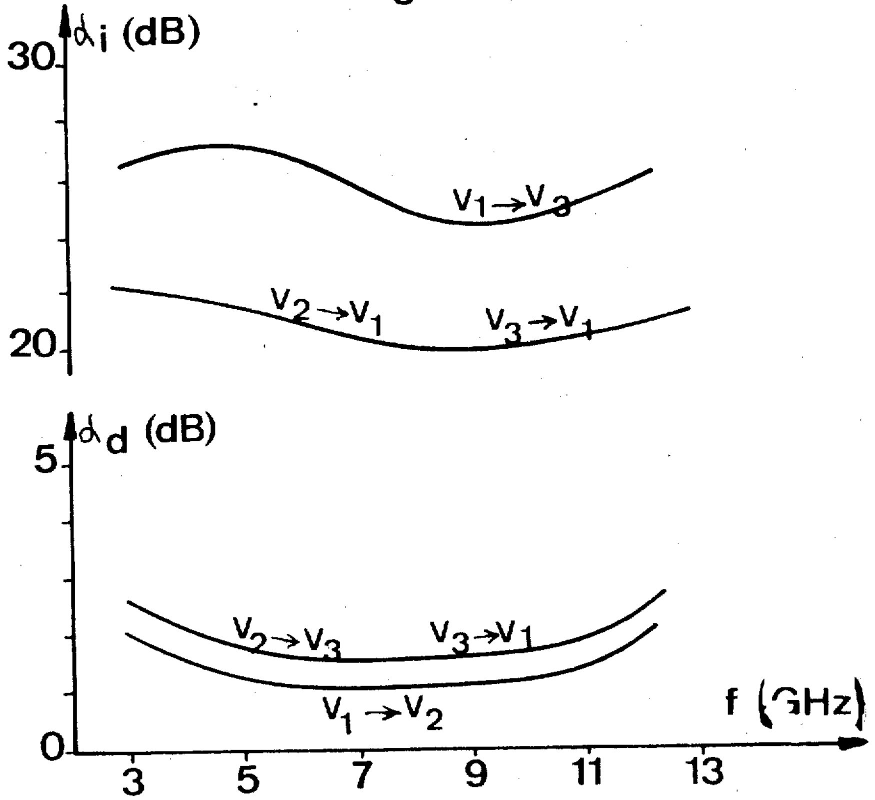
Figure 34:
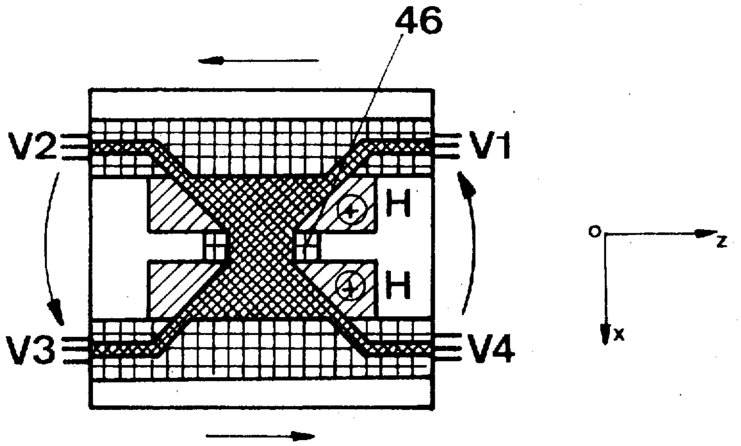
Figure 35:
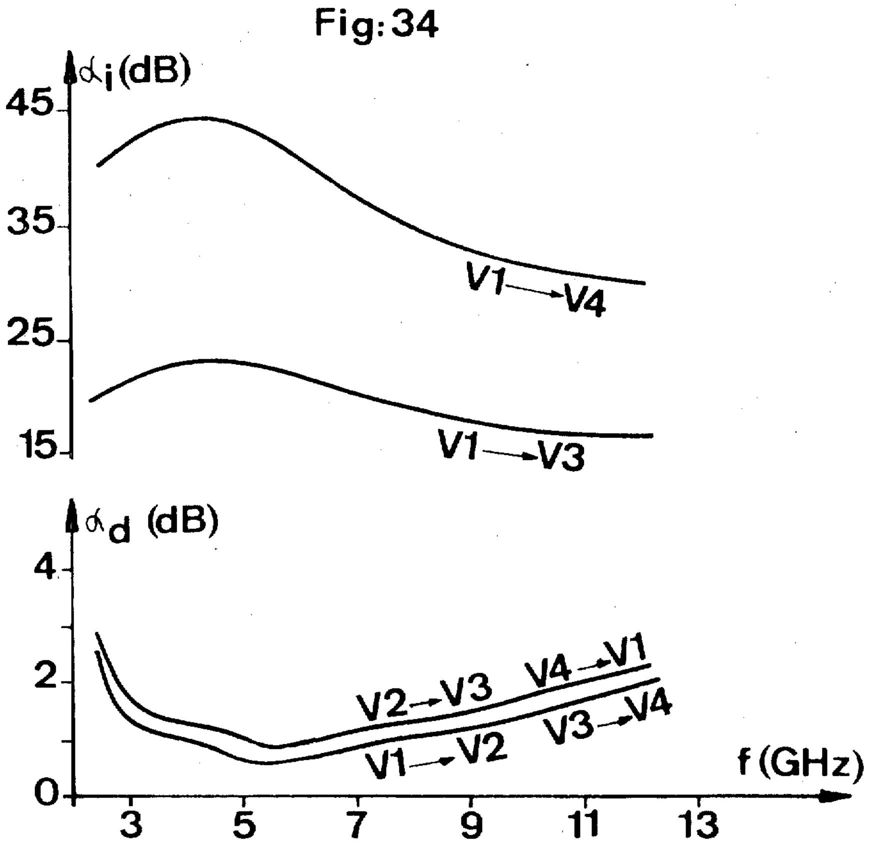
Figure 36:
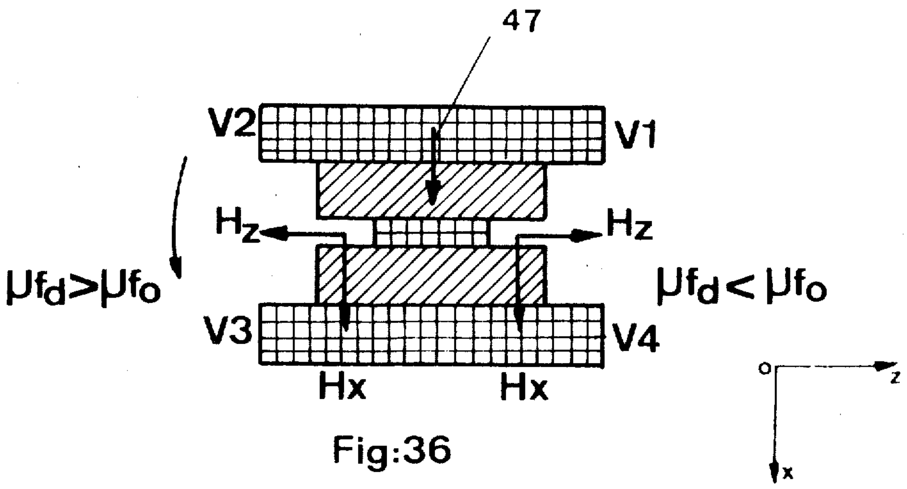
Figure 37:
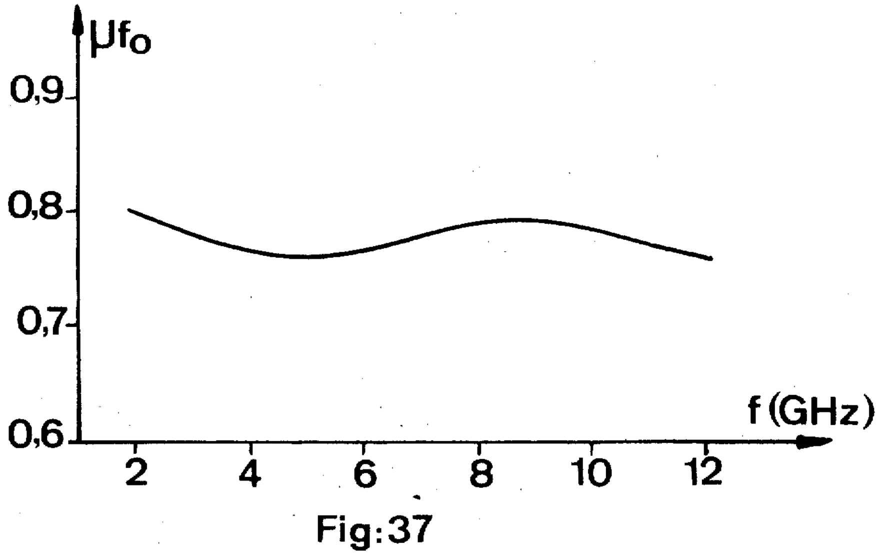

FIGS. 32 and 34 illustrate respectively three and four ports circulators of which the characteristic curves are shown in FIGS. 33 and 35 respectively, and FIGS. 36 and 37 are diagrams explaining the operation of the circulator of FIG. 34.

For a readier understanding of the figures, the same references have been used throughout the different constructional variants and the following conventions have been observed: the gyromagnetic material is represented by single inclined hatching, the (conductive) ground plane without hatching, the wave adapters (or surface wave launchers) are filled by inclined and perpendicular cross-hatching, the absorbent loads by double hatching formed of horizontal and inclined lines, and the parts consisting of dielectrics by cross-hatching formed of horizontal and vertical lines. Likewise, in the following, the terms "ferrites," "magnetic material" and "gyromagnetic material" are all used to denote bodies exhibiting the phenomenon of gyromagnetic resonance, which has been referred to in the foregoing, regardless of their crystal structure. It is well known that two very different families of materials are the most commonly employed, i.e., the spinels and the garnets. Also the same trirectangular reference axes are used: O, $x$, $y$, $z$. O$z$ is the forward direction of propagation.

The isolator of FIGS. 1 and 1$a$ consists essentially of a slab 2 of gyromagnetic material which rests on a metal plate 1. The surface wave is excited by means of a very thin metal coating 5, which is shown in plane view in FIG. 1$a$. The adapter is terminated by a triangle at each end and is located half-way through the thickness of the magnetic medium 2. There is therefore a second slab 2' above the metal sheet 5. The width of the sheet is sufficient to prevent any electromagnetic wave of type TEM from being able to travel through the structure. The width of the slab is similar to that of the metal sheet 5, but it is sufficiently small in relation to the plate 1 (of infinite width) for a surface wave of the quasi TM type to propagate therein (and not a TM wave). The unidirectional magnetising magnetic field H perpendicular to the plane of the slabs 2–2' is created by a magnet diagrammatically indicated at 8. A load 4 which absorbs the microwave energy is disposed along the slabs. The incoming TEM wave is applied through input plug 6 and the TEM output wave is carried away by plug 7 in the forward direction.

A housing 9 cooperates with metal plate 1 to provide mechanical protection of the device. Under these conditions, the magnetic field has a longitudinal component H$z$ perpendicular to the component H$x$, as illustrated in FIG. 1$a$ for a forward wave. The polarisation of the h.f. magnetic field is at least elliptical. Under the action of the d.c. magnetic field H, the permeability of the material is greater than the initial permeability $\mu_{fo}$ in a direction of propagation of the wave and for the other direction it is smaller. The energy is concentrated, in each direction of propagation, round the side where the polarisation by the magnetic field establishes the highest permeability. The dimensions of the slab 2 are so chosen that, in the absence of a unidirectional field, the polarisation of the h.f. field is almost circular and all the energy is propagated outside the slab 2. It is then absorbed by the load 4 situated on the side of the slab 2. The direction of the unidirectional magnetising field is such that, in the forward direction of propagation, the energy propagates along the side opposite to the attenuator, the insertion loss therefore remaining small. In the reverse direction of propagation, the energy propagates in the attenuator 4, where it is absorbed.

In a particular embodiment, the gyromagnetic material of the two slabs 2 and 2' is iron-yttrium garnet, whose saturation induction is about 1,700 gauss. The length of the plates is 55 mm, their width 10 mm and their thickness 1.5 mm. The copper wave adapter sheet 5 is disposed between the two slabs and has a width of 10 mm and a thickness of 0.05 mm.

A direct attenuation of less than 2.5 dB has been obtained in the frequency band from 3.5 to 8.5 GHz for a reverse attenuation of 15 dB in the same frequency band.

In a construction of the apparatus according to FIG. 1 using two yttrium garnet slabs of double width, i.e., about 20 mm, the forward attenuation obtained is in the neighbourhood of 3 dB in the same frequency band, but the reverse attenuation is less than 6 dB. The reduction of the non-reciprocity can readily be explained. When the width of the magnetic slab is increased, the propagation of the fundamental mode TM is made easier. Now, this mode exhibits a rectilinear polarisation of the h.f. magnetic field, whereby the non-reciprocal phenomenon is suppressed (by suppression of any interaction with the external magnetising field).

FIG. 1$a$ illustrates a surface wave adapter 5 having an axis of symmetry parallel to the direction of propagation. The variant of FIG. 2 does not exhibit this symmetry. It permits of obtaining a widening of the bandwidth of the isolator. As will be apparent, the adapter 5 is terminated by transition portions of flared, dissymetrical form. The transition zones 51 and 52 are limited by arcs 53 and 54 which are convex towards the axis of symmetry of the slab and these arcs terminate at different distances $C_1$ and $C_2$ from the longitudinal axis of the isolator, defined by the line joining the points of interconnection with the coaxial plugs 6 and 7.

The increase in the bandwidth due to the unsymmetrically shaped the adapter is also obtained on all the other structures which will hereinafter be described, and more particularly the structures having no ground plane 1 (FIG. 21) and the structures, such as that of FIG. 8, which have no electrical continuity between the inner conductors of the input and output plugs (FIG. 8) as well as those having a composite propagation medium (FIG. 14).

In an isolator constructed by the Assignee in accordance with FIG. 2 and operating below 1,000 MHz, the dimensions and the characteristics are as follows:

$c_1 = 5$ mm and $c_2 = 10$ mm

| | |
|---|---|
| Width of the ferrite slab 2 | 55 mm |
| Length of the ferrite | 82 mm |
| Thickness of the ferrite | 1.5 mm |
| Thickness of the adapter coating 5 | 0.05 mm |

The magnetic material constituting the slab is of the Cal-Van-Big (calcium, vanadium, bismuth) garnet type.

FIG. 3 shows experimental curves giving the attenuation as a function of the frequency, on the one hand for a wave adapter structure whose input and output are symmetrical in accordance with FIG. 1*a* and, on the other hand, for a dissymmetrical structure according to FIG. 2. The curve 60 relates to $c_1 = c_2 =$ 5 mm (FIG. 1*a*), curve 61 to $c_1 = c_2 =$ 10 mm and curve 62 to $c_1 =$ 5 mm and $c_2 =$ 10 mm (FIG. 2).

FIG. 4 shows a modified method of excitation of the surface wave permitting an improvement of the performances (reverse attenuation and bandwidth inter alia). The wave adapter 5 of the isolator of FIG. 4 is derived from that of FIG. 2 by cutting the structure of FIG. 2 into two along its longitudinal axis of symmetry and introducing a dissymmetry into the widths, at the input and at the output of the conductive surface wave adapter plate 5. The surface wave adapter then takes the form of a curvi-rectilinear hexagon having one large side and one small side parallel to one another, and of which two adjacent sides orthogonal to the said large side have different lengths. The metal layer or sheet 5 is formed with a plurality of radiating slots 10 being dimensioned such as to radiate at the central frequency of the band or at a number of different frequencies therein. A single radiating slot of appropriate shape can also be used. An additional attenuator 11 (separate from the attenuator 4 of FIG. 1) is then disposed above the radiating slots to absorb the additional radiated energy. Consequently, the total reverse attenuation is much higher, while the forward attenuation remains unchanged. The presence of the attenuator 11 makes it impossible to retain the second ferrite slab 2', which has been mentioned with reference to FIG. 1. The slots 10 bring about a considerable increase in the reverse attenuation, as shown by the two curves 69 and 70 of FIG. 5, the curve 69 relating to an adapter having four slots of 2 mm × 3 mm, which give a maximum attenuation at about 6 GHz and the curve 70 to the same adapter without slots.

In order to reduce the insertion loss, there have been added four slots 12 situated in the forward path of the isolator. In accordance with the same idea involving guiding towards 4 and 11 the maximum energy of the ferrite in the reverse direction, it is also possible to cause the maximum energy to propagate around the ferrite in the forward direction by means of radiating slots 12. However, in order to obtain minimum forward attenuation, it is necessary to cover the slots situated in the forward path with a dielectric 13 of appropriate permittivity. A reduction of the insertion loss of 0.5 dB has been obtained in the band of FIG. 5.

In FIG. 4, slots are shown both in the forward path and in the reverse path, but it is to be understood that according to the object aimed at a single series of slots only may be used.

Figure 6:
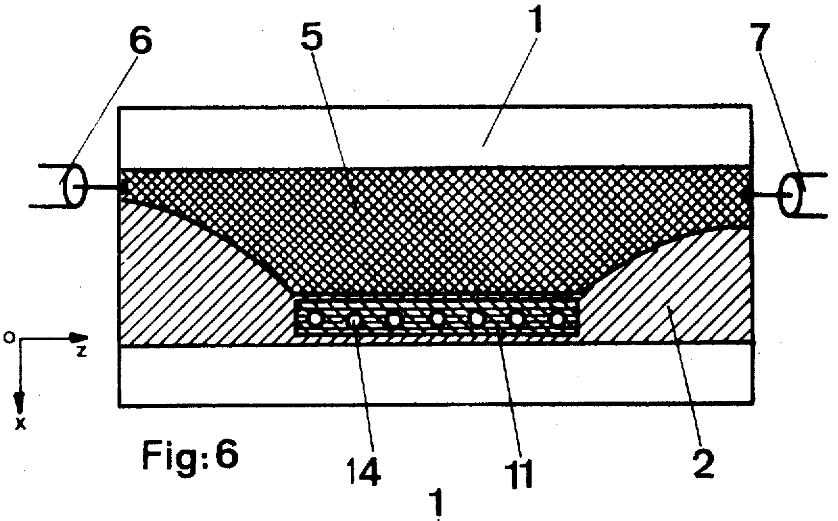
Figure 6A:
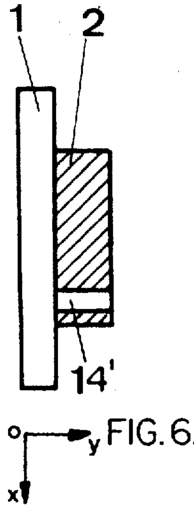

Referring to FIGS. 6 and 6*a*, the slots 10 in the wave adapter are replaced by holes 14 made in the ferrimagnetic material, which are either empty or filled with dielectric pins 14' whose permittivity differs from that of the ferrimagnetic material and which introduce discontinuities in the reverse wave and optionally in the forward wave.

Referring to FIG. 7, the discontinuities are produced by grooves 15 in the lateral face of the ferrimagnetic material.

Hybrid surface waves are propagated by the isolator, that is to say, the wave has h.f. magnetic field components along each of the three reference axes. It is therefore possible to obtain non-reciprocal surface wave devices using unidirectional fields whose directions are not always perpendicular to the plane of the ferrite slab (that is along O*y*). More particularly devices may be designed with a unidirectional field having a longitudinal component and a transverse component parallel to the plane of the ferrite slab. A constructional example is illustrated in FIG. 8, which relates to a structure having no electrical continuity between the wave adapters 5 and 5' connected to the internal conductors of the coaxial input and output plugs 6 and 7. A transverse unidirectional field parallel to the ferrite slab 2 is supplied between the magnetic poles 16 and 17 of a magnet. The wave adapter 5–5' is shaped to provide matching of the impedances. It incorporates λ/4 transformers well known per se. In the X-band, difference between reverse and forward attenuation of 20 dB have been obtained with such a structure.

The isolator structures just described comprise matched load 4 (and optionally an auxiliary matched load 11) which is adapted to the operating frequency. Such loads, which generally consist of iron powder agglomerated in a plastic dielectric material, are commercially available. In the variants illustrated in FIGS. 9 and 11, the ferrite itself performs the function of absorbing the microwave energy in the reverse direction, which greatly simplifies the design of the isolators. In fact, it is then limited merely to a slab 2 of gyromagnetic material, optionally disposed on a conductive plate 1, associated with a surface wave adapter 5 of appropriate shape. The structure is completed by a second slab 2' of gyromagnetic material mounted on the structure illustrated in the figures.

The behaviour of the magnetic material both as a propagation support for the surface wave and as an absorber may be explained with reference to the curves of FIG. 10, which are taken from the book entitled: "Microwave ferrites and ferrimagnetics" by Lax and Button, published by McGRAW-HILL in 1962, page 300. These curves show, at 9 GHz, the real and imaginary components of the scalar permeability seen by two circularly polarised waves whose magnetic field vectors turn in opposite directions, in the case where the external unidirectional magnetising field is perpendicular to the direction of the magnetic microwave field. The curves are of the samd general form for any gyromagnetic material at frequencies which depend on the material. These curves retain their form for a given material, the maximum and minimum as a function of the value of the magnetising field generally shifting towards higher values of the field when the frequency increases. In the case of the lower frequencies (UHF between 100 and 1,000 MHz), the ferrite may show high losses with zero magnetising field, corresponding to operation beyond the gyromagnetic resonance. In this case, the internal field has almost the gyromagnetic resonance field value. It is then possible by applying a magnetising field to cause the ferrite to operate outside resonance, with lower loss due to the shifting of the resonance.

Sufficient stress has already been laid upon the possibility of dividing any non-planar wave into two circularly polarised waves of opposite rotation. It can be seen from the curves of FIG. 10 that, with a direction of rotation of the magnetic field represented by the sign "−" in the figure, the two components of the permeability are substantially constant when the external field varies, or only slightly different from their value with zero magnetising field. On the other hand, in the case of the wave denoted by the sign "+", the losses $u''_+$ pass through a very considerable maximum, corresponding to the gyromagnetic resonance phenomenon. The variation of the second component $u'_+$ of the permeability are also very considerable. Now, as has been explained in the foregoing, a TM or hybrid surface wave has at least two components of the magnetic field, one of which is parallel to the direction of propagation. As has been stated with reference to FIG. 1*a*, there is set up in the gyromagnetic material a surface wave whose polairsation become increasingly elliptical from the axis of symmetry of the structure, the directions of rotation of the magnetic field vector being opposite on either side of the axis. In the case of dissymmetrical excitation (see FIGS. 2, 4, 6 and 7) the distribution of the energy between the components of the elliptically polarised wave having opposite directions of rotation of the magnetic field is also dissymmetrical, and it is possible by using a surface wave adapter of the type illustrated in FIG. 4 to concentrate almost all the input nergy (TEM mode) in one of the two surface waves propagating in a quasi-TM or $HE_{11}$ mode. This amounts to considering only one of the halves of the structure of FIG. 1*a* as defined by the axis of symmetry. Under these conditions, all the volume of the magnetic material is occupied by a + wave (or − wave), to use the notations of the above-mentioned book. The energy propagating in the reverse direction therefore takes the form of a − (or +) wave.

If two juxtaposed magnetising fields of different values are established within the magnetic material, said values being chosen so that the corresponding permeability values are quite different, at least in one direction o propagation, and the magnetic losses are high for one of these values in the reverse direction, absorption of the energy is provided by the magnetic material itself in the reverse direction. The magnetising field values are chosen by reference to the curves of the available magnetic materials such as the curves in FIG. 10 at the operating frequency.

Referring to the curves of FIG. 10 it will be seen that two fairly different types of operation are possible. The choice is made on the basis of the characteristics of the available ferrities, at the desired operating frequency range. The first type is applicable to ferrites having high losses at zero magnetising field, that is to say, to ferrities which are saturated under a zero external field at the operating frequency. The application of an external magnetic field to such a material shifts the gyromagnetic resonance towards the higher frequency values. The direction and the value of the applied field are then so chosen that the ferrite is magnetised below resonance so as to reduce the losses. This type of operation is particularly useful at low frequencies (several hundred MHz). It requires a magnetising field which is in the opposite direction with respect to the field at resonance. The second mode necessitates the application of the two different nonzero field values of A and B (see FIG. 10) above the value corresponding to gyromagnetic resonance. This type of operation corresponds to that which has been described in the foregoing examples. Generally speaking, the characteristics obtained are better when the ferrite is associated with a matched dielectric (equal products *u*), as will hereinafter be explained (FIG. 14).

FIG. 9 is a view from above on to an isolator which consists only of a substantially rectangular ferrite slab 2 disposed on a metal ground plate 1. Disposed on the ferrite is the surface wave adapter 5 consisting of a metal sheet in contact with the central conductors of the coaxial input and output plugs 6 and 7. The form of the slab 2 and that of the sheet 5 are so chosen as to favour the guiding of the waves and the absorption of the energy in the high-loss zone of the material 2 in the reverse direction. The surface wave adapter 5 is in the form of a hexagon, extended on the shorter of the sides parallel to the direction of propagation by a rectangle $5_1$. As will be apparent, the slab of gyromagnetic material 2 is formed with bevels $2_1$, $2_2$ in the neighbourhood of the rectangular part $5_1$ of the mode adapter 5. A second ferrite slab identical to the slab 2 is normally disposed above the surface wave exciting electrode 5. The assembly thus formed is disposed in a metal casing and a magnetic field is set up in the upper half of the structure, perpendicular to the plane of the figure and directed upwards. This structure does not incorporate any absorbent load (such as 4 in the variants just described). As has been explained (see FIG. 2), the form of the mode adapter 5 makes it possible to set up a non-reciprocal dissymetric wave, that is to say, it favours one of the two (+ and −) waves mentioned above to the detriment of the other.

Such a structure has been designed with a view to producing an isolator which operates in the lower microwave range (between 200 and 400 MHz). It is known that the design of devices utilising the properties of gyromagnetic materials at such low frequencies has hitherto been very difficult. The ferrite used is characterised by a value $4\pi M_s = 900$ gauss/cm$^3$ ($M_s$ being the saturation induction). The external field is about 450 oersteds and the standing wave ratio lower than two in the frequency band.

The geometrical dimensions of the rectangular part of the slab 2 are 82 × 60 × 8 (in mm). The adapter 5 consists of brass of a thickness of 0.95 mm. The metal plate constitutes one of the walls of the casing. As will be apparent from FIG. 12, there are obtained between 220 megacycles and 380 megacycles insertion losses of less than 4 decibels, reaching 2 decibels at the centre of the band and reverse isolation higher than 13 decibels and reaching 18 decibels at the centre of the band. In the following Table 1, there are given the values of the insertion loss ($\alpha_D$) and isolation ($\alpha_I$) of the structure of FIG. 9 and of an isolator of identical dimensions, in which the lower part of the ferrite (part bevelled at $2_1$ and $2_2$) is replaced by an absorbing load consisting of an agglomerate based on iron powder according to current use (see Table 1 below).

The conditions of operation of this device correspond to the first type of operation mentioned in the foregoing, that is to say, an external magnetising field, lower than the field corresponding to the gyromagnetic resonance in the operating frequency range. The forward direction corresponds to the wave denoted by "−" and the reverse direction denoted by "+" in FIG. 10. The magnetic magnetising field is applied in approximately the upper half of the structure.

TABLE 1

| F | 200 | 220 | 240 | 260 | 280 | 300 | 320 | 340 | 360 | 380 | 400 |
|---|---|---|---|---|---|---|---|---|---|---|---|
| Iron powder load: | | | | | | | | | | | |
| $\alpha_D$ | 6.5 | 6.5 | 6 | 5 | 5 | 2.5 | 2 | 1.4 | 1 | 1.5 | 2.4 |
| $\alpha_i$ | 7 | 7.5 | 8 | 9.5 | 14 | 18 | 16 | 9 | 8 | 8 | 8 |
| Ferrite load: | | | | | | | | | | | |
| $\alpha_D$ | 5 | 4 | 3.5 | 2.7 | 2.2 | 2 | 2.2 | 2.3 | 2.5 | 3 | 3.4 |
| $\alpha_i$ | 12 | 14 | 15 | 15 | 15 | 16 | 16 | 15 | 13 | 13 | 12 |

It will be seen that the figure of merit $\alpha_i/\alpha_D$ of the isolator having a ferrite matched load is higher than that of the isolator having an iron powder matched load. The use of the ferrite itself as absorbing material simplifies the construction of the device and improves the matching of the wave, above all in the reverse direction.

FIG. 11 illustrates a modified construction in which the form of the metallisation 5 used as mode adapter is made more continuous by the use of a partially curvilinear trapezoidal form, as illustrated. Such a structure is used with a view to providing an isolator between 200 and 300 megacycles with a gyromagnetic material of the garnet type, whose saturation induction is characterised by $4\pi M_s = 400$ gauss/cm$^3$. The magnetic field is so established that that fraction of the structure which is situated outside the field has the following dimensions in millimetres: 104 × 10 × 12. The results obtained are illustrated in FIG. 13. It will be seen that between 225 and 300 megacycles the insertion losses remain below 2.5 decibels and the reverse losses are higher than 11 decibels. The isolator structure having no externally applied matched load also affords advantages in cases where the propagation support for the microwave is complex (gyromagnetic material and dielectric material), as is explained in reference to FIG. 14. Such an isolator is designed so that, in the forward direction, the energy propagates mainly along the dielectric. In the reverse direction, the propagation takes place along the ferrite part having high losses. This part is preferably that which is most remote from the dielectric.

In some very wide band applications, it is necessary to obtain a circular or quasi-circular polarisation of the h.f. magnetic field which is more clearly defined. In addition, the energy not absorbed in the forward direction which propagates outside the material may be disturbed by the presence of a metal casing or disturb neighbouring circuits. A study of the propagation of a surface wave in a complex structure (magnetic material and dielectric material) shows that the presence of the dielectric favours the establishment of a circular polarisation of the h.f. magnetic field of the wave, since it develops a longitudinal component of the electric field to the detriment of the transverse electric field. Any electric field modification is accompanied by a magnetic field modification and vice versa. Consequently, the presence of a longitudinal electric field component gives rise to a longitudinal magnetic field component which strengthens the magnetic field component due to the finite transverse dimension of the slab of gyromagnetic material The addition of a dielectric slab will also reinforce one of the elliptically polarised waves at the detriment of the other. There are no longer, as in the case of the structure comprising a single material (cf. FIG. 1*a*), two waves having elliptical magnetic field polarisations rotating in reverse directions but one clearly preponderant wave. This therefore has the further advantage of giving the gyromagnetic material a much higher efficiency. This quasi-circular polarisation is particularly favourable to a high interaction between the h.f. magnetic field and the unidirectional magnetising field and consequently enhances the non-reciprocal character of such a structure. FIG. 14 is a reproduction of FIG. 1 in the case of an isolator utilising a non-homogeneous propagation support. On the practical plane, the propagation of the surface wave in the composite material 2,3 necessitates electrical continuity of the structure in the forward direction in order to obtain an acceptable insertion loss. For this purpose, it is necessary to match the characteristic impedances of the dielectric and magnetic parts of the structure. These conditions of phase and amplitude equality are above all necessary for ensuring that the surface wave is not transformed at least partially into a radiated wave.

Since the permeability of the ferrite is tensorial and the propagation medium is magnetised in the direction Oy, the value of the permeability is not the same in the directions Oy and Ox and depends upon the orientation of the direction of propagation (Oz) in relation to the plane $x$Oy. In the forward direction, the permeability along Oy (parallel to the magnetising field) is denoted by $\mu_{fo}$. In the case where the unidirectional magnetic field is very weak, $\mu_{fo}$ is in the neighbourhood of the initial permeability (with zero magnetising field), while in the direction O$x$ it is found that it has almost the same value as the component in the direction Oz. In the following, this value will be denoted by $\mu_{fd}$. It may be lower or higher than $\mu_{fo}$, depending upon the operating conditions and the nature of the ferrite (cf. curve FIG. 10).

In order that the surface wave may be maintained, the phase shifts of the wave transmitted along the gyromagnetic material and the dielectric material must be the same. This means that the geometrical and electrical parameters of the medium must satisfy substantially the following relations:

$$\epsilon_f \cdot \mu_{fo} \# \epsilon_e \mu_e \quad (1)$$

$$a_1 \sqrt{\epsilon_f \mu_{fd}} = a_2 \sqrt{\epsilon_e \mu_e} \quad (2)$$

in which $\epsilon_f$ is the dielectric constant of the ferrite material, $\epsilon_e$ is that of the dielectric and $\mu_e$ the permeability of the dielectric equal to that of a vacuum. $\mu_{fo}$ and $\mu_{fd}$ have the meanings previously specified, and $a_1$ and $a_2$ are the respective dimensions of the ferrite and of the dielectric in the direction O$x$ (cf. FIG. 14).

These formulae can be used for the structure of both FIGS. 14 and 20 (with or without ground plane).

The isolator of FIGS. 14 and 14*a* consists essentially of a metal plane 1, a slab 2 of magnetic material, and a slab 3 of dielectric material resting on said isolator plate. $a_1$ and $a_2$ are respectively the widths of these slabs which have a common height $b$. The direction of propagation is perpendicular to the cross-section $(a_1 = a_2)b$ of the medium. The solator also comprises an attenuator 4 located on the dielectric 3 and having almost the same dimensions as the latter. The excitation of the surface wave is effected by a metallic coating 5 shown in plane view in FIG. 15. In practice, the magnetic part 2 is made up of two superposed slabs, the upper face of the lower slabs bearing a metallic deposit 5, the form of which is shown in FIG. 15. The isolator also comprises an input plug 6 (see FIG. 14*a* where XX' shows front plane of FIG. 14) and an output plug 7 which are intended for the interconnection. The permanent magnet 8 establishes in the material 2 a magnetic field represented by H. 9 is the casing which can be used for the purpose of mechanically protecting the device, it being understood that it does not participate in the propagation, but performs a purely mechanical function, and is by no means essential, the device being sufficiently robust. The assembly 1, 2, 3 constitutes a line structure of the Harms-Goubau type, which is able to propagate a surface wave of the quasi-TM type. The theory shows that the establishment of the TM mode corresponds to infinite values of $a_1$ and $a_2$. In the present case, it may be assumed, and experience confirms this, that the surface wave propagates in such a structure in a quasi-TM mode. In such a mode of propagation, the largest component of the electric field is parallel to the magnetising field H. Under these conditions, the presence of the thin metal plate 5 used for the excitation of the surface waves will not interfere with the distribution of the electric field provided it is infinitely thin (at the operating wavelength). In fact, it produces a slight deformation of the electric field which does not distort the propagation. The wave adapter 5 (see FIG. 15) has the form of a blunt cone, the optimum form of which has been experimentally determined from that of the horns currently used in the excitation of surface waves in cylindrical structures, described notably in the article published in "Annales des Telecommunications," Vol. 8, No. 11, November 1953 by Chavance and Chiron.

The opening of the adapter is fairly small, because the radio space factor in the input of the adapter is very small owing to the presence of the high-permittivity ferrite material in this input. The interconnections with the outside plugs are made by connecting the central core of the coaxial plugs 6 and 7 to the adapter 5 cut from a copper sheet. The metal plate 5 is particularly favourable to the operation of the isolator. As is apparent from FIG. 15, it covers almost the whole surface of the magnetic material 2. Experience shows that it is possible to use a surface wave adapter occupying only a fraction of the surface of the part 2. However, the presence of a metal plane of great length at the centre of the ferrite material prevents any propagation in accordance with the usual mode TEM. Indeed calculation shows that the presence of the sheet 5 reduces the characteristic impedance of the medium to a value below 1 ohm for propagation in the mode TEM. Hence, even if the surface wave adapter 5 does not effect a perfect transformation of the input TEM wave into a surface wave, the former is prevented from propagating in the structure. The adapter 5 therefore performs the function of a filter for parasitic modes. The characteristic curves of FIG. 16 have been obtained with a device analogous to that illustrated in FIG. 14, having the following dimensions: $a_1 = a_2 = 10$ mm, $b = 3$ mm. The ferrite material constituting the part 2 is a pure iron yttrium garnet, and the dielectric constituting the port 3 is a sintered ceramic having a magnesium titanate base. The initial permeability $\mu_{fo}$ of the garnet employed is about 0.80, as shown in FIG. 37, the component of the tensorial permeability in the forward direction is of the order of 1.60, the permeability of the ferrite is $\epsilon_f = 15$, and the permeability of the dielectric is $\epsilon_e = 15$. The surface wave exciter 5 is a copper plate of 0.05 mm thick and 10 mm wide.

The attenuator 4 consists of an agglomerate of iron powder and resin of a thickness of 3 mm. The magnetising field is about 300 oersteds.

FIG. 16 shows the experimental curves giving as a function of frequency the insertion losses (lower curve) $\epsilon_D$ and the attenuation in the reverse direction (upper curve) $\alpha_i$. It will be noted that the forward attenuation retains a value which does not exceed 2.5 dB between 3 and 19 GHz. The upper curve shows that the reverse attenuation is not lower than 21 dB in the same band. It reaches 30 dB at some frequencies. The structure of FIG. 2 is not optimum, notably in regard to the choice of the magnetic material, owing to the lower end of the frequency band, and also in regard to the choice of the parameters $a_1$ and $a_2$, as will hereinafter be seen.

The operation of the device may be summarised as follows. It may be considered that, under the action of the magnetising field H, the permeability of the ferrite reaches a value in the neighbourhood of 1.60 in the forward direction of propagation. The dimensions $a_1$, $a_2$ and $b$ are so chosen that the radio space factor of the quasi-TM surface wave is in the neighbourhood of the volume of the medium 1,2,3. In the reverse direction of propagation, the apparent permeability of the medium 2 is reduced to a low value in relation to $u_{fo}$ (of the order of 0.25) in a particular construction and almost all the energy propagates in the right-hand part of the structure, i.e., towards the dielectric 3 and around the latter, for the reasons previously explained. The dimensions of the dielectric are inferior to the ratio space factor. Under these conditions, a large part of the energy propagates in the volume occupied by the attenuator 4, in which it is dissipated in the form of heat. In addition, the dielectric part also acts, under these conditions, as a radiating element. This explanation takes account of the non-reciprocal character of the device, but does not claim physical accuracy.

There is shown in FIG. 17 a variant of the construction of FIG. 14, that is to say, an isolator in which the propagation takes place in a structure consisting of a metal ground plane 1 associated with a magnetic part 2 and a dielectric part 3. In the variant of FIG. 17, the different geometrical and electrical parameters are so chosen that, in the reverse direction, the energy surrounds the structure on the side of the gyromagnetic material. For this purpose, in contrast to the preceding structures, the forward direction of propagation is that in which the value of the permeability of the ferrite under magnetising field $\mu_{fd}$ is lower than $\mu_{fo}$. In this case, the energy in the forward direction is concentrated around the dielectric and the insertion loss is lower than that obtained in a structure utilising the forward propagation around the ferrite. The attenuator 4 is then essentially disposed in claim phsyical accuracy.

There is shown in FIG. 17 a variant of the construction of FIG. 14, that is to say, an isolator in hich the ropagation take place in a structure consisting of a metal ground plane 1 associated with a magnetic part 2 and a dielectric part 3. In the variant of FIG. 17, the different geometrical and electrical parameters are so chosen that, in the reverse direction, the energy surrounds the structure on the side of the gyromagnetic material. For this purpose, in contrast to the preceding structures, the forward direction of propagation is that in which the value of the permeability of the ferrite under magnetising field $\mu_{fd}$ is lower than $\mu_{fo}$. In this case, the energy in the forward direction is concentrated around the dielectric and the insertion loss is lower than that obtained in a structure utilising the forward propagation around the ferrite. The attenuator 4 is then essentially disposed in the neighbourhood of the gyromagnetic material 2, as will be apparent from FIGS. 17 and 18.

The curves of FIG. 17*a* are the characteristics of an isolator constructed in accordance with the diagram of FIG. 17. The solid-lined curves represent the data relative to a structure having a homogeneous propagation medium (the dielectric 3 being omitted), while the chain-lined curves represent the data relative to a structure identical with that of the FIG. 17. The influence of the dielectric is thus shown. As has been illustrated, the mode exciter has the same form as that of FIG. 11. The matched load 4 has been added on the magnetic material side.

FIG. 18 is a diagrammatic illustration of a variant of the construction of FIG. 17, in which the matched load 4 surrounds the ferrite 2 on two faces.

There is shown in FIG. 18*a* a preferred variant for the excitation of the surface wave in a structure according to FIG. 17. Since the permeability of the ferrite $\mu_{fd}$ is smaller than $\mu_{fo}$, the radio space factor of the energy in the forward direction is larger and the excitation can be more difficult. This difficulty is met by horn excitation: a metal horn 6B filled with a dielectric 6A in a central bore of which the composite medium 2–3 is lodged. The horn excitation supplements the excitation by the metal coating 5.

FIG. 19 illustrates a dissymmetrical surface wave adapter. It is the equivalent of te dissymmetrical exciter illustrated in FIG. 4, matched to the structure of FIG. 14, and the same references are employed. This form of exciter shows a dissymmetry between the small sides $c_1$ and $c_2$ of the curvilinear trapezium, the radiating slots 10 and 12, the auxiliary load 11 in the neighbourhood of the matched load 4, and the matching dielectric 13 in the neighbourhood of the slots 12 in proximity to the dielectric 3.

FIG. 20 illustrates the results (insertion loss $\alpha_D$ and isolation $\alpha_I$) which are achieved with a structure according to FIG. 17 with parameters optimized with respect to the embodiment having the characteristics shown in FIG. 17*a*.

FIG. 21 illustrates a modified construction of an isolator according to the invention. Technologically, the essential difference between the structure of FIG. 21 and that of FIG. 14 resides in the absence of the metal ground plane 1 in this new construction. There will be seen at 2 the magnetic material, at 3 the dielectric material, and at 5 the metal plate serving as the surface wave adapter. The adapter 5 may be analogous to the construction of FIG. 15.

In a modified construction of the isolator as illustrated in FIG. 21, the dielectric 3 is omitted. The propagation of the surface wave takes place in the structure limited to the gyromagnetic material 2. The construction is similar to that of FIG. 1 (the ground plane 1 being omitted). It is obvious that such a structure falls within the scope of the invention. However, the disadvantages already mentioned with reference to the structure of FIG. 1 are again present here and the composite structure appears to be a preferable solution.

FIG. 22 is a sectional view of a preferred construction of the interconnection of the device of FIG. 21. As is apparent, the surface wave adapter consists essentially of a metal cylinder 6B similar to that of FIG. 11, which is filled with a dielectric material 6A whose permittivity is similar to that of the gyromagnetic material 2 and a thin metal sheet 5 is in contact with the central conductor of the coaxial plus 6. In this type of excitation, which is particularly applicable to structure having no ground plane, it is unecessary for the central metal sheet to be continuous over the whole length of the device and there may be no metallic connection between the two central conductors of the coaxial plugs. Such a structure excites in the structure 2,3 of FIG. 21 a surface wave which propagates in the mode $HE_{11}$ (or a very similar mode) in the solid dielectric waveguide consisting of the assembly 2,3. The parts 2 and 3 have the same dimensions and the same nature as those employed in the construction of the homologous elements illustrated in FIG. 14. The characteristic curve of the isolator thus formed, from the viewpoint of the attenuations, is shown in FIG. 23.

FIG. 24 illustrates a variant of the device in which the composite propagation medium is of cylindrical shape. The dielectric 2 and the ferrite 3 are in the form of bars of semicircular cross-section, whose two plane faces are joined together along a diametrical plane 20. The attenuator 4 is in the form of a cylindrical casing which surrounds either the whole structure or mainly that part which serves as a support for the propagation in the reverse direction, as is illustrated in FIG. 24. The interconnections are made as in the preceding structures by means of coaxial plugs 6 and 7 whose central conductors 21 are connected to the surface wave adapter 22 consisting of a metal sheet disposed in the plane of the face common to the parts 2 and 3 and having the form of a rectangle associated with two isosceles triangles whose bases are identical with the small side of the rectangle, as illustrated in FIG. 25. In some constructions in which the device is long, the single exciter 22 may be replaced by two non-contiguous mode transformers such as ABCDE and A'B'C'D'E'.

FIG. 26 is a diagrammatic plan view of a non-reciprocal surface wave phase shifter corresponding to the structure of the isolator of FIG. 1, that is to say to a homogeneous propagation support medium consisting only of gyromagnetic material. The ferrite slab 2 and the exciter 5, as well as the interconnecting plugs 6 and 7 are shown. The form of the surface wave adapter is of the dissymmetrical type illustrated in FIG. 11, the slab 2 being rectangular, since in the case of the phase shifter absorption of the energy by the ferrite must be avoided. In a particular construction, the ferrite slab has the following dimensions: $l$ = 10.5 mm, L = 65 mm and thickness 1.5 mm. The ferrite employed has a saturation induction of 1,750 gauss/cm$^3$ at 9 GHz. The phase shift characteristic with respect to the magnetising field is illustrated in FIG. 27. It is uniform over the whole surface of the device. By way of comparison, there is shown in FIG. 29 the characteristic curve of a non-reciprocal phase shifter corresponding to the structure of FIG. 28, i.e., a composite structure of gyromagnetic material (2) and dielectric material (3) associated with a ground plate (1). The surface wave adapter 5 is disposed between the slabs of materials.

The magnetising field necessary for obtaining a maximum phase variation is substantially of the same value of the unidirectional magnetising field employed in the isolator structure of FIG. 14, or in the isolator structure of FIG. 17 for obtaining a maximum ratio between the reverse attenuation and the forward attenuation. Under the same conditions of operation and with the same dimensions, the results obtained at 6 GHz confirm that the energy is almost entirely within the medium in one direction of propagation and almost entirely outside the medium in the other direction. However, in a phase shifter, it may be troublesome to obtain attenuations which are different for the two directions of propagation. It has been seen in the foregoing, in the case of isolators, that the attenuation in the reverse direction resultd (at least partly) in losses by radiation from the structure and this cause of loss must be obviated in a phase shifter. It is therefore important to choose the dimensions $a_1$ $a_2$ and $b$ (see FIG. 14) of the structure in such manner that the volume of dielectric is greater than the space ratio in order to reduce the losses in the reverse direction of propagation, in the designs where the impedance of the ferrite is low in the reverse direction. The theory of the propagation of a surface wave in a solid dielectric waveguide allows to fix the geometrical parameters of the structure in such manner as to meet this condition.

It is possible to construct a circulator by means of 3 such phase shifters each providing preset phase shift. FIGS. 30 and 31 are the diagrams of known circulator constructions produced from phase shifters assembly. The delta circulator of FIG. 30 consists of three phase shifters 30, 31 and 32, each of which provides a differential phase shift of 60° and which consist, for example, of the phase shifter of FIG. 28. The three ports of the circulator are shown at 33, 34 and 35 respectively. Such a circulator has already been described in U.S. Pat. No. 3,560,892 filed on Nov. 29, 1968 and assigned to the present Assignee.

The diagram of FIG. 31 corresponds to a simple circulator structure having four ports 36, 37, 38 and 39 of a well-known type. The circulator comprises two 3 dB couplers 40 and 41 and two 90° phase shifters 42 and 43 similar to the design of FIG. 28. One of paths also comprises a second phase shift network 44 which effects a fixed phase shift of 180° and which consists, for example, of a length of line, optionally loaded with dielectric, and of a length equal to half the phase wavelength in the line. The couplers 40 and 41 may be, for example, of the type described in the article published by Shelton in the April 1965 issue of the journal "Microwaves," pages 14 to 19. The coupler is obtained by association of 8.34 dB couplers. They cover the 1–10 GHz band and consequently do not limit the band of the phase shifters. Couplers suitable for this construction are described in U.S. Pat. No. 3,020,494 filed on Sept. 24, 1959 and assigned to the present Assignee.

The diagram of the FIG. 32 is a sectional view along a central plane containing the direction of propagation of one variant of the three-port circulator according to the invention. This circulator consists essentially of a unit of the same type as that illustrated in FIG. 17 from which the attenuator 4 has been omitted. It has been replaced by a coupler connected to a coaxial output $V_3$. This coupler may be constructed for a transmission line consisting of a dielectric wafer 45 completely or partially covered by a metal coating. This metallisation is connected to the central conductor of the coaxial output $V_3$ and optionally to the metal sheet 5 serving for the main surface wave excitation. The principle of operation of this circulator is the following: in the direction of propagation from $V_1$ to $V_2$ (arrow), the direction of the magnetising field is such that the surface wave is situated within the material. In the reverse direction of propagation, the energy is situated outside the structure, as is known, and is absorbed by the coupling device of the output $V_3$. For the same reasons, the energy re-entering through the port $V_3$ reappears in the output $V_1$.

The curves of FIG. 33 illustrate the characteristics of the circulator of FIG. 32.

The diagram of FIG. 34 is a view along the same plane of a four-port circulator according to the invention. This circulator essentially consists of two units of the same type as that illustrated in FIG. 17. These two units are placed in parallel side-by-side and are connected by a coupling device 46 of the same type as 45 used for the coupling at the port $V_3$ of the circulator of FIG. 32. In some constructions, there is no coupling 46 and the two units are juxtaposed with one another without gap. The diagram of FIG. 36 represents the direction of the h.f. magnetic fields in the structure. In one preferred embodiment of the invention, the direction of the unidirectional magnetising field applied to the two cells in the same. In this case, the energy reentering the port $V_2$ of this circulator follows the direction indicated by the arrow and is thereafter capable of being divided into two parts, one of which can be directed towards the port $V_3$ and the other towards the port $V_4$.

As is shown in the figure, the energy directed towards the port $V_4$ finds an h.f. field polarisation such that the permeability of the gyromagnetic material is small, while the energy directed towards the port $V_3$ finds high permeability. The energy leaving the port $V_2$ is channelled towards the high-permeability direction and reappears et the port $V_3$. Conversely, in the direction from 3 to 4, the permeability of the material is low and the energy is retained within the medium and reappears at the port $V_4$.

The curves of FIG. 35 show the characteristics of the four-port circulator of FIG. 32. It will be observed that the attenuations in the four directions of forward propagation are substantially the same, which is a great advantage over four-port circulators formed by a combination of two three port junction circulators.

The designs of the circulators of FIGS. 32 and 34 is based on the use of composite medium consisting of magnetic material and dielectric material and on structures having a ground plane. It is obvious that it is possible without departing from the scope of the present invention to construct circulators from cells made from a homogeneous material (without dielectric) and structure having no ground plane.

THEORETICAL BASIS FOR THE PARAMETER SELECTION

The propagation of a surface wave of the TM or quasi-TM type in the structure of FIG. 14 can be mathematically studied from the basis of the article by H. Kaden "dielektrische and metallische Wellenleiter"

and that of Severin and Schulten published in the Philips Technical Review, Vol. 26, No. 4 (1965) page 114. The calculus given notably in Appendix 1 of the first article applies to the composite medium 1, 2, 3 when the applied magnetising field H is zero. The magnetic material then behaves as a dielectric material of permeability $\mu_{fo}$ and of dielectric constant $\epsilon_f$, these two quantities being scalar quantities, i.e., constant in the material and independent of the orientation in relation to a fixed reference, and of the frequency if the material is correctly chosen. By way of example, there are shown in FIG. 37 the variations of the zero-field permeability of the yttrium iron garnet between 2 and 12 GHz. It will be seen that this parameter remains very substantially constant in the band. This is not the case in the presence of a non-zero magnetising field H, the permeability of the magnetic material then becomes a tensor. These considerations make it possible to reconsider the calculations made by Kaden. The study leads to the same general conclusions, namely that the structure has no cut-off frequency. However, the finite value of the parameters $a_1$ and $a_2$ leads to the notion of "minimum frequency" transmissible through the medium 1-2-3 with a preset forward attenuation (theoretical insertion loss of the device without taking into account the losses of mode transformation or excitation losses). If it is assumed that about 25 percent of the energy can propagate outside the composite material and be absorbed in the absorbing slab in the forward direction, i.e., about 1 dB of loss at the lowest operating frequency, the following simplified formula is obtained:

$$\lambda_{max} \# 5 \sqrt{2 a_2 b \epsilon_e} \quad (3)$$

$\epsilon_e$ = dielectric permittivity;
$a_2$ = width of the dielectric slab;
$b$ = common thickness of the two parts of the medium 2–3.

Formula (3) was calculated on the assumption that formulae (1) and (2) previously given are satisfied. In this case, it may be considered that the magnetic material behaves in the same way as the dielectric material and the composite material can therefore be regarded as analogous to a homogeneous dielectric material of double width.

It has been assumed throughout the foregoing that surface wave exist in the structure 1–2–3. However, the existence of such waves imposes conditions, at least on the geometrical dimensions of the structure. By utilising the results of the theoretical study relative to cylindrical structures which has been published by H. Severin and G. Schulten in previously mentioned article, in the conditions of the structures of FIG. 14, it is possible to establish a relation between the maximum frequency of the surface wave and the geometrical parameters which guarantees the existence of the surface wave. This relation is:

$$1/\lambda_{min} \sqrt{(2a_1 b/\pi)(\epsilon_f \mu_{fd} - 1)} + \sqrt{(2a_2 b/\pi)(\epsilon_e - 1)} \leq 0.76 \quad (4)$$

where:
$a_1$ = width of the magnetic material;
$a_2$ = width of the dielectric material;
$b$ = common height of the two parts;
$\epsilon_f$ and $\mu_{fd}$ = respectively the permittivity and the permeability of the magnetic material in the forward direction of propagation;
$\epsilon_e$ = permittivity of the dielectric ($\mu_e = 1$).

Formulae (1), (2), (3) and (4) allow determination of the dimensions $a_1$, $a_2$, and $b$ so as to operate in a given frequency band. A complete study of the propagation in the structure would lie outside the scope of the present description. Equations (1), (2), (3) and (4) also apply to the structure of FIG. 5, taking into account, as observed by Kaden, the analogy between the structures if the electrical image theory is applied.

The numerical application of the equations (1), (2), (3) and (4) in the frequency band under consideration (3 – 12 GHz) has given the following results (proceeding from the values measured):

$$\epsilon_e = 10 \quad \epsilon_f = 13 \quad \mu_{fo} = 0.8 \quad \mu_{fd} = 0.25$$

$$d = 3 \text{ mm} \quad a_1 = 16 \text{ mm} \quad a_2 = 10 \text{ mm} \quad F_{max} = 10{,}500 \text{ MHz}$$

$$F_{min} = 2{,}400 \text{ MHz}$$

What we claim:

1. A wideband non-reciprocal device for UHF/VHF and microwave frequency bands designed according to microwave integrated circuit technology based on the non-reciprocal properties of gyromagnetic materials coupled with an electromagnetic wave which propagates along an axis according to a surface mode of the TM, quasi-TM or hybrid $HE_{11}$ type, with a r.f. field, the electric field vector of which has two components, one of which lies along said axis, said device comprising:
   - a medium serving as a propagation support for the surface wave and consisting at least partly of gyromagnetic material having permeability $\mu_{fo}$ and permittivity $\epsilon_f$ at zero external magnetizing field and a first dimension extending along the entire length of the propagation path in a direction along the axis of propagation and having two other dimensions small in relation to said first dimension;
   - means for establishing an external magnetizing field perpendicular to said propagation axis, in at least a part of said gyromagnetic material, of such a value that the permeability of said gyromagnetic material subjected to said field, $\mu_{fd}$, is very different from $\mu_{fo}$, along at least one of the forward and reverse directions of propagation along said axis;
   - input means for feeding said device with a TEM space wave;
   - means for transforming the input TEM space wave into a TM, quasi-TM or quasi hybrid $HE_{11}$ surface wave, and for transforming the surface waves into an output TM space wave; and
   - output means for coupling a TEM space wave out of said device.

2. Wideband non-reciprocal transmission device according to claim 1, wherein the means for transforming the input TEM space wave consists of a thin metal plate disposed within the gyromagnetic part of the propagation support medium over its whole length along the propagation axis and cut into a trapezoidal form whose bases are parallel to the said direction of propagation and whose apices belonging to the large base are extended by conductive strips designed as a matching line section with said input and output means.

3. Wideband non-reciprocal device according to claim 1 wherein the means for transforming the input TEM space wave consists of two planar conductive/coplanar structures of like shape containing the axis of propagation and serving as a plane of symmetry to the cross-section of the gyromagnetic part of said support medium, the said structures being cut along rectangular trapeziums whose bases are parallel to said direction of propagation and whose apex corresponding to the large base whose angle is not a right angle is extended by a conductive strip designed as a matching line section with said input and output means.

4. Wideband non-reciprocal device according to claim 1 of the isolator type, wherein the gyromagnetic material of the propagation support is in contact with a matched load over at least one of its faces and the unidirectional magnetizing field is so established that in one of the directions of propagation the value of the permeability $\mu_{fd}$ is high in relation to the value of the permeability at zero magnetizing field at least around the contact surface with said matched load.

5. Non reciprocal device according to claim 1, wherein means for transforming is a metal layer having the general form of a rectangle whose longitudinal axis is parallel to the axis of propagation and whose apices are rounded by curvilinear recesses whose convexity faces said longitudinal axis, the said recesses bounding two rectilinear parts on those sides of the rectangle which are perpendicular to the longitudinal axis, at a point of which parts there are applied the input and output connections said point differing from their center.

6. Non-reciprocal device according to claim 1, wherein the said means for transforming is a metal layer having the general form of a trapezium whose parallel sides are parallel to the axis of propagation with a smaller side and a larger side and whose apices adjacent to the said smaller side are rounded by curvilinear recesses whose convexity faces said larger side, the said recesses bounding two rectilinear portions on those sides of the trapezium which are perpendicular to the parallel sides and which have different lengths the input and output connections being applied near the non-rounded angles.

7. Non-reciprocal device according to claim 1 characterized in that grooves are cut in the gyromagnetic material along a side parallel to the axis of propagation.

8. Non-reciprocal device according to claim 1 wherein the said gyromagnetic medium includes machined recesses.

9. Non-reciprocal device according to claim 1, including means for establishing two different magnetizing field values within said propagation supporting gyromagnetic medium a first value within a first part and a second value within a second part said two parts having a junction surface containing the axis of propagation, and one of said parts acting as an energy absorber in one direction of propagation.

10. Non-reciprocal transmission device of the phase-shifter type according to claim 1 which includes a dielectric material in contact with said medium supporting the surface wave propagation, said dielectric material contacting said medium along a surface which contains the axis of propagation.

11. Non-reciprocal device according to claim 3, characterized in that radiating slots matched to the pass band of the device are cut along both of the two sides parallel to the axis of propagation from said metal layer, the said slots along one of the said two sides being covered with a load wafer and the slots along the other side being covered with dielectric material wafer.

12. Non-reciprocal device according to claim 5, characterized in that radiating slots matched to the pass band of the device are cut from said metal layer along the sides parallel to the propagation, the said slots being covered with wafer of energy absorbing material.

13. Wide band non-reciprocal device according to claim 12 in which said wafer is a dielectric material.

14. Non-reciprocal device according to claim 9 wherein one of the said two magnetic field values is zero.

15. Non-reciprocal device according to claim 9, wherein said two magnetic field values are higher than the value of the field corresponding to the gyromagnetic resonance of the material in the operating frequency range.

16. Non-reciprocal device according to claim 9 wherein said two magnetic field values are lower than the value of the field corresponding to the gyromagnetic resonance in the operating frequency range.

17. Non-reciprocal transmission device according to claim 10 in which at least one of the two magnetizing fields is directed opposite to the magnetizing field which builds up gyromagnetic resonance within said gyromagnetic material.

18. Non-reciprocal device according to claim 10 wherein the shape of the region of the gyromagnetic material which is maintained under a zero external field is adapted to support the waves propagating in the higher attenuation direction.

19. A wideband non-reciprocal device for UHF/VHF and microwave frequency bands designed according to microwave integrated circuit technology based on the non-reciprocal properties of gyromagnetic materials coupled with an electromagnetic wave which propagates along an axis according to a surface mode of the TM, quasi-TM or hybrid $HE_{11}$ type, with a r.f. field the electric field vector of which has two components, one of which lies along said axis, said devices comprising:

- a medium serving as a support for the propagation of the surface wave and consisting at least partly of gyromagnetic material having permeability $\mu_{fo}$ and permittivity $\epsilon_f$ at zero external magnetizing field and having a first dimension extending along the entire length of the propagation path in the direction along the axis of propagation and having two other dimensions which are small in relation to said first dimension;
- means for establishing a unidirectional magnetizing field perpendicular to said propagation axis in at least a part of said gyromagnetic material of such a value that the permeability of said material subject to said field, $\mu_{fd}$, is very different from $\mu_{fo}$, at least along one of the forward and reverse directions of propagation along said axis;
- input means for feeding such device a TEM space wave;
- means for transforming the input TEM space wave into TM, quasi-TM, or quasi hybrid $HE_{11}$ surface wave, and for transforming inversely the surface waves into an output TM space wave;

output means for coupling a TEM space wave out of said devices; and a conductive ground plate in contact with said medium supporting the propagation having a dimension perpendicular to the axis of propagation which is large in relation to the corresponding dimension of said medium.

20. Wideband non-reciprocal transmission device according to claim 19, wherein the means for transforming the input TEM space wave consists of a thin metal plate disposed within the gyromagnetic part of the propagation support medium over its whole length along the propagation axis and cut into a trapezoidal form whose bases are parallel to the said direction of propagation and whose apices belonging to the large base are extended by conductive strips designed as a matching line section with said input and output means.

21. Wideband non-reciprocal device according to claim 19 wherein the means for transforming the input TEM space wave consists of two planar conductive/coplanar structures of like shape containing the axis of propagation and serving as a plane of symmetry to the cross-section of the gyromagnetic part of said support medium, the said structures being cut along rectangular trapeziums whose bases are parallel to said direction of propagation and whose apex corresponding to the large base whose angle is not a right angle is extended by a conductive strip designed as a matching line section with said input and output means.

22. Wideband non-reciprocal device according to claim 19 of the isolator type, wherein the gyromagnetic material of the propagation support is in contact with a matched load over at least one of its faces and the unidirectional magnetizing field is so established that in one of the directions of propagation the value of the permeability $\mu_{fd}$ is high in relation to the value of the permeability at zero magnetizing field at least around the contact surface with said matched load.

23. Non-reciprocal device according to claim 19, wherein the means for transforming is a metal layer having the general form of a rectangle whose longitudinal axis is parallel to the axis of propagation and whose apices are rounded by curvilinear recesses whose convexity faces said longitudinal axis, the said recesses bounding two rectilinear parts on those sides of the rectangle which are perpendicular to the longitudinal axis, at a point of which parts there are applied the input and output connections said point differing from their center.

24. Non-reciprocal device according to claim 19 characterized in that grooves are cut in the gyromagnetic material along a side parallel to the axis of propagation.

25. Non-reciprocal device according to claim 19 wherein the said gyromagnetic medium includes machined recesses.

26. Non-reciprocal device according to claim 19, including means provided for establishing two different magnetizing field values within said propagation supporting gyromagnetic medium a first value within a first part and a second value within a second part said two parts having a junction surface containing the axis of propagation, and one of said parts acting as an energy absorber in one direction of propagation.

27. Non-reciprocal transmission device of the phase-shifter type according to claim 19 which includes a dielectric material in contact with said medium supporting the surface wave propagation, said dielectric material contacting said medium along a surface which contains the axis of propagation.

28. Non-reciprocal transmission device of the phase-shifter type according to claim 19 in which said medium supporting the surface wave propagation includes a dielectric material in contact with said medium along a surface which includes the direction of propagation.

29. Non-reciprocal device according to claim 19 wherein said gyromagnetic medium includes a plurality of recesses filled with dielectric pins.

30. Non-reciprocal device according to claim 19 wherein said means for transforming is a metal layer having the general form of a trapezium whose parallel sides are parallel to the axis of propagation with a smaller side and a larger side and whose apices adjacent to said smaller side are rounded by curvilinear recesses whose convexity faces said larger side, said recesses bounding two rectilinear portions on both sides of the trapezium which are perpendicular to the parallel sides and which have different lengths, the input and output connections being applied near the non-rounded angles.

31. Non-reciprocal device according to claim 21, characterized in that radiating slots matched to the pass band of the device are cut along both of the two coplanar structures parallel to the propagation, the said slots along one of the said two sides being covered with a load wafer and the slots along the other side being covered with dielectric material wafer.

32. Non-reciprocal device according to claim 30, characterized in that radiating slots matched to the pass band of the device are cut from said metal layer along the sides parallel to the propagation, the said slots being covered with wafer of energy absorbing material.

33. Wideband non-reciprocal device according to claim 32, characterized in that said wafer is dielectric.

34. Non-reciprocal device according to claim 26 wherein one of the said two magnetic field values is zero.

35. Non-reciprocal device according to claim 26 wherein said two magnetic field values are higher than the value of the field corresponding to the gyromagnetic resonance of the material in the operating frequency range.

36. Non-reciprocal device according to claim 26 wherein said two magnetic field values are lower than the value of the field corresponding to the gyromagnetic resonance in the operating frequency range.

37. Non-reciprocal transmission device according to claim 27 in which at least one of the two magnetizing fields is directed opposite to the magnetizing field which builds up gyromagnetic resonance within said gyromagnetic material.

38. Non-reciprocal device according to claim 27 wherein the shape of the region of the gyromagnetic material which is maintained under a zero external field is adapted to support the waves propagating in the higher attenuation direction.

39. A non-reciprocal wideband device for UHF/VHF and microwave frequency bands designed according to microwave integrated circuit technology based on the non-reciprocal properties of gyromagnetic materials coupled with an electromagnetic wave which propagates along an axis according to a surface mode of the TM, quasi-TM or hybrid $HE_{11}$ type, with a r.f. field the electric field vector of which has at least two components, one of which lies along said axis, said device comprising:

a composite medium serving as a support for the propagation of the surface wave and comprising at least a first part consisting of a gyromagnetic material having permeability and permittivity at zero magnetizing field of $\mu_{fo}$ and $\epsilon_f$ respectively and a second part consisting of dielectric material having electrical characteristics $\mu_e = 1$ and $\epsilon_o$, the two parts having a common junction surface containing the axis of propagation and being so chosen that in the absence of an external magnetizing field $\mu_{fo} \epsilon_f \# \mu_e \epsilon_e$;

means for establishing a unidirectional magnetizing field perpendicular to said propagation axis in at least a part of said gyromagnetic material and of such value that the permeability under said field $\mu_{fd}$, is very different from $\mu_{fo}$, at least along one of the forward and reverse directions of propagation along said axis;

input means for feeding such device with a TEM space wave;

means for transforming the input TEM space wave into TM, quasi-TM or quasi-hybrid $HE_{11}$ surface wave, and for transforming the surface waves into an output TEM space wave; and output means for coupling a TEM space wave out of said device.

40. Transmission device according to claim 39, wherein the two parts of said composite medium are half cylinders of equal semi-circular cross section in contact along their plane face to form a complete cylinder the axis of propagation extending along the junction of the parts.

41. Non-reciprocal transmission device of the phase-shifter type according to claim 39 including a second dielectric material in contact with the magnetic side of said composite mediums supporting the surface waves propagation along a surface which comprises the direction of propagation.

42. Non-reciprocal transmission device according to claim 39 wherein said means for transforming consists of a combination of a metal layer having the general form of a trapezium whose parallel sides are parallel to the direction of propagation with a smaller side and a larger side and whose apices adjacent to the smaller side are rounded by curvilinear recesses whose convexity faces the said larger side, the said recesses bounding two rectilinear parts on the sides of the trapezium which are perpendicular to the parallel sides and which have different lengths, the input and output means being connected near the non-rounded angles, and of two horns filled with a dielectric material situated at the ends of the magnetic part of the medium serving as the propagation support and surrounding the said part in a plane perpendicular to the said metal layer.

43. Non-reciprocal transmission device according to claim 39 wherein said means for transforming is a metal layer having the general form of a trapezium whose parallel sides are parallel to the direction of propagation with a smaller side and a larger side and whose apices adjacent to the smaller side are rounded by curvilinear recesses whose convexity faces said larger side, the said recesses bounding two rectilinear portions on the sides of the trapezium which are perpendicular to the parallel side and which have different lengths, the input and output means being connected near the non-rounded angles.

44. A non-reciprocal wideband device for UHF/VHF and microwave frequency bands designed according to microwave integrated circuit technology based on the nonreciprocal properties of gyromagnetic materials coupled with an electromagnetic wave which propagates along an axis according to a surface mode of the TM, quasi-TM or hybrid $HE_{11}$ type, with a r.f. field the electric field vector of which has at least two components, one of which lies along said axis, said device comprising:

a composite medium serving as a support for the propagation of the surface wave and comprising at least a first part of gyromagnetic material having electrical characteristics at zero external magnetizing field $\mu_{fo}$ and $\epsilon_f$ and a second part of dielectric material having electrical characteristics $\mu_e = 1$ and $\epsilon_e$, the two parts having a common junction surface containing the axis of propagation and being so chosen that, in the absence of magnetizing field $\mu_{fo} \epsilon_f \# \mu =_e \epsilon_e$;

means for establishing an external magnetizing field perpendicular to said propagation axis in at least a part of said gyromagnetic material of such a value that the permeability, under said field, $\mu_{fd}$, is very different from $\mu_{fo}$, at least along one of the forward and reverse directions of propagation along said axis;

input means for feeding such device with a TEM space wave;

a means for transforming the input TEM space wave into TM, quasi-TM, or quasi-hybrid $HE_{11}$ surface wave, and for transforming the surface waves into an output TEM space wave;

output means for coupling a TEM space wave and of said device;

a conductive ground plate in contact with the said medium supporting the propagation and having dimension perpendicular to the direction of propagation which is large in relation to the corresponding dimension of the composite medium.

45. Non-reciprocal transmission device according to claim 44 in which means are provided for establishing two different magnetizing field values within the gyromagnetic propagation supporting medium, a first value within a first part and a second value within a second part, said two parts having a junction surface which contains the axis of propagation.

46. Non-reciprocal device of the three-port circulator type according to claim 44 wherein a third dielectric part having electrical characteristics $\mu'_e = 1$ and $\epsilon'_e$ is disposed in contact with the first part of magnetic material along a junction surface parallel to that of the parts and such that: $\mu_{fo}\epsilon_f = \mu_e\epsilon_e = \mu'_e\epsilon'_e$ and the means for transforming has a general triangular form of which the apices are extended by line sections partially overlapping the second part of dielectric and the third apex partially overlapping the third dielectric part is in contact with a third connection means.

47. Non-reciprocal transmission device of the phase-shifter type according to claim 44 in which said composite mediums supporting the surface wave propagation includes a second dielectric material part in contact on the magnetic side of said medium, along a surface which includes the direction of propagation.

48. Non-reciprocal transmission device according to claim 44 wherein said means for transforming consists of a combination of a metal layer having the general form of a trapezium whose parallel sides are parallel to the axis of propagation with a smaller side and a larger side and whose apices adjacent to the smaller side are rounded by curvilinear recesses whose convexity faces said larger side, said recesses bounding two rectilinear parts on the sides of the trapezium which are perpendicular to the parallel side and which have different lengths, the input and output means being connected near the non-rounded angle, and of two horns filled with a dielectric material at the ends of the magnetic part of the medium serving as the propagation support and surrounding the said part in a plane perpendicular to said metal layer.

49. Non-reciprocal transmission device according to claim 44 wherein said means for transforming is a metal layer having the general forM of a trapezium whose parallel sides are parallel to the axis of propagation with a smaller side and a larger side and whose apices adjacent to the smaller side are rounded by curvilinear recesses whose convexity faces the said larger side, the said recesses bounding two rectilinear portions on the sides of the trapezium which are perpendicular to the parallel side and which have different lengths, the input and output means being connected near the non-rounded angles.

50. Non reciprocal transmission device according to claim 44 wherein said means for transforming consists of a combination of a metal layer having the general form of a trapezium whose parallel sides are parallel to the direction of propagation with a smaller side and a larger side and whose apices adjacent to the smaller side are rounded by curvilinear recesses whose convexity faces the said larger side, the said recesses bounding two rectilinear parts on the sides of the trapezium which are perpendicular to the parallel sides and which have different lengths, the input and output means being connected near the non-rounded angles, and of two horns filled with a dielectric material situated at the ends of the magnetic part of the medium serving as the propagation support and surrounding the said part in a plane perpendicular to the said metal layer.

51. Non-reciprocal transmission device according to claim 50 wherein means for transforming is a metal layer having the general form of a trapezium whose parallel sides are parallel to the direction of propagation with a smaller side and a larger side and whose apices adjacent to the smaller side rounded by curvilinear recesses whose convexity faces said larger side, the said recesses bounding two rectilinear portions on the sides of the trapezium which are perpendicular to the parallel sides and which have different lengths, the input and output means being connected near the non-rounded angles.

52. Non-reciprocal device of the four-port circulator type according to claim 46 in which the structure serving as a support for the propagation includes a part symmetrical thereto about a line parallel to the axis of propagation and extending through the third part consisting of dielectric, and the surface wave adapter has non-rectilinear sides between two adjacent apices.

53. Non reciprocal device of the three-port circulator type according to claim 46 wherein the triangular surface wave adapter has at least two curved sides.

54. Non-reciprocal transmission device according to claim 51 including means for establishing two different magnetizing field values within the gyromagnetic propagation supporting medium a first value within a first part and a second value within a second part, said two parts having a junction surface lying in the direction of propagation.

55. A non-reciprocal wideband device for UHF/VHF and microwave frequency bands designed according to microwave integrated circuit technology based on the non-reciprocal properties of gyromagnetic materials when coupled with an electromagnetic wave which propagates along an axis according to a surface mode of the TM, quasi-TM, or hybrid $HE_{11}$ type, with a r.f. field, the electric field vector of which has two components, one of which lies along said axis, said device comprising:

- a medium serving as a support for the propagation of the surface wave and consisting at least partly of gyromagnetic material having permeability $\mu_{fo}$ and permittivity $\epsilon_f$ at zero external magnetizing field and extending along the entire propagation path of the device in the direction along the axis of propagation and having two other dimensions which are small in relation thereto;
- means for establishing an external magnetizing field with a non-zero component along said propagation axis in at least a part of said gyromagnetic material of such a value that the permeability of said material, subjected to said field, $\mu_{fd}$, is very different from $\mu_{fo}$, at least along one of the forward and reverse directions of propagation along said axis;
- input means for coupling a TEM space wave to said device;
- means for transforming the input TEM space wave into TM, quasi-TM, or quasi-hybrid $HE_{11}$ surface wave, and for transforming the surface waves into an output TEM space wave;
- output means for coupling a TEM space wave out of said device; and
- a conductive ground plate in contact with said medium supporting the propagation whose dimension perpendicular to the axis of propagation is large in relation to the corresponding dimension of said medium.

56. A non-reciprocal wideband device for UHF/VHF and microwave frequency bands designed according to microwave integrated circuit technology based on the nonreciprocal properties of gyromagnetic materials when coupled with an electromagnetic wave which propagates along an axis according to a surface mode of the TM, quasi-TM, or hybrid $HE_{11}$ type, with a r.f. field the electric field vector of which has two components, one of which lies along said axis, said device comprising:

- a composite medium serving as a support for the propagation of the surface wave and comprising at least a first part consisting of a gyromagnetic material having permeability and permittivity at zero external magnetizing field of $\mu_{fo}$ and $\epsilon_f$ respectively and a second part consisting of dielectric material having electrical characteristics $\mu_e = 1$ and $\epsilon_e$, the two parts having a common junction surface containing the axis of propagation and being so chosen that, in the absence of an external magnetizing field $\mu_{fo}\,\epsilon_f \# \mu_e\,\epsilon_e$;

means for establishing an external magnetizing field with a non-zero component along said propagation axis in at least a part of said gyromagnetic material of such a value that the permeability, under said filed, $\mu_{fd}$, is very different from $\mu_{fo}$, at least along one of the forward and reverse directions of propagation along said axis;

input means for coupling a TEM space wave to said device;

means for transforming the input TEM space wave into TM, quasi-TM or quasi hybrid $HE_{11}$ surface wave, and for transforming the surface waves into an output TEM space wave; and output means for coupling a TEM space wave out of said device.

57. A non-reciprocal wideband device for UHF/VHF and microwave frequency bands designed according to microwave integrated circuit technology based on the nonreciprocal properties of gyromagnetic materials coupled with an electromagnetic wave which propagates along an axis according to a surface mode of the TM, quasi-TM or hybrid $HE_{11}$ type, which a r.f. field, the electric field vector of which has two components, one of which lies along said axis, said device comprising:

a composite medium serving as a support for the propagation of the surface wave and comprising at least a first part of magnetic material having electrical characteristics at zero external magnetizing field $\mu_{fo}$ and $\epsilon_f$ and a second part of dielectric material having electrical characteristics $\mu_e = 1$ and $\epsilon_e$, the two parts having a common junction surface containing the axis of propagation and being so chosen that, in the absence of magnetizing field, $\mu_{fo}\,\epsilon_f \# \mu_e\,\epsilon_e$;

means for establishing an external magnetizing field with a non-zero component along said propagation axis in at least a part of said gyromagnetic material of such a value that the permeability, under said field, $\mu_{fd}$, is very different from $\mu_{fo}$, at least along one of the forward and reverse directions of propagation along said axis;

input means for coupling a TEM space wave to said device;

means for transforming the input TEM space wave into TM or quasi-TM or quasi-hybrid $HE_{11}$ surface wave, and for transforming the surface waves into an output TEM space wave;

output means for coupling a TEM space wave out of said device; and a conductive ground plate in contact with said medium supporting the propagation whose dimension perpendicular to the direction of propagation is large in relation to the corresponding dimension of the composite medium.

* * * * *

UNITED STATES PATENT OFFICE

CERTIFICATE OF CORRECTION

Patent No. 3,845,413 Dated December 13, 1974

Inventor(s) Bernard Chiron; Claude Rannou; Nicole Bernard

It is certified that error appears in the above-identified patent and that said Letters Patent are hereby corrected as shown below:

[30] Foreign Application Priority Data

| | | |
|---|---|---|
| June 4, 1971 | France.................... | 71.20.343 |
| Aug. 27, 1971 | France.................... | 71.31.223 |
| Mar. 28, 1972 | France.................... | 72.10.778 |

Signed and Sealed this

*twenty-seventh* Day of *April 1976*

[SEAL]

*Attest:*

RUTH C. MASON
*Attesting Officer*

C. MARSHALL DANN
*Commissioner of Patents and Trademarks*